United States Patent
Fletcher et al.

(10) Patent No.: US 7,313,249 B2
(45) Date of Patent: Dec. 25, 2007

(54) MARK EMBEDDING AND DETECTION USING PROJECTIVE TRANSFORMS

(75) Inventors: Peter Alleine Fletcher, Rozelle (AU); Stephen James Hardy, Leichhardt (AU); Kieran Gerard Larkin, Putney (AU)

(73) Assignee: Canon Kabushiki Kaisha, Tokyo (JP)

( * ) Notice: Subject to any disclaimer, the term of this patent is extended or adjusted under 35 U.S.C. 154(b) by 913 days.

(21) Appl. No.: 10/660,623

(22) Filed: Sep. 12, 2003

(65) Prior Publication Data
US 2004/0086197 A1    May 6, 2004

(30) Foreign Application Priority Data
Oct. 3, 2002   (AU) .............................. 2002951815

(51) Int. Cl.
*G06K 9/00*   (2006.01)
(52) U.S. Cl. .................. 382/100; 382/276; 382/302
(58) Field of Classification Search ............. 382/100, 382/169, 232, 240, 248, 250, 276, 277, 280, 382/281, 302; 380/51, 54, 210, 252, 287; 713/176, 179; 370/527, 529; 704/203, 269; 715/523
See application file for complete search history.

(56) References Cited

U.S. PATENT DOCUMENTS

| | | | | |
|---|---|---|---|---|
| 6,233,347 B1 * | 5/2001 | Chen et al. | ................. | 382/100 |
| 6,282,300 B1 * | 8/2001 | Bloom et al. | ................ | 382/100 |
| 6,904,151 B2 * | 6/2005 | Deguillaume et al. | ...... | 382/100 |
| 2002/0085735 A1 | 7/2002 | Fletcher et al. | | |
| 2003/0123660 A1 | 7/2003 | Fletcher et al. | | |

FOREIGN PATENT DOCUMENTS

| | | |
|---|---|---|
| GB | 2 365 295 A | 2/2002 |
| GB | 2 365 296 A | 2/2002 |
| JP | 2002-099882 A | 4/2002 |
| WO | 01/26110 A1 | 4/2001 |
| WO | 01/54331 A | 7/2001 |

* cited by examiner

*Primary Examiner*—Samir Ahmed
*Assistant Examiner*—Abolfazl Tabatabai
(74) *Attorney, Agent, or Firm*—Fitzpatrick, Cella, Harper & Scinto

(57) ABSTRACT

A method (200) is disclosed of detecting one or more patterns embedded in an image. Each pattern embedded in the image has been formed from a one-dimensional basis function. The method (200) starts by calculating (210) a projective transform of the image. A 1-D correlation is then calculated (220) between the projective transform and the basis function for a selection of angles. Finally, one or more peaks of the correlation are found (230). The position of each of the peaks provides spatial parameters of one of the one or more embedded patterns.

23 Claims, 17 Drawing Sheets

Cartesian Space

Axis of symmetry

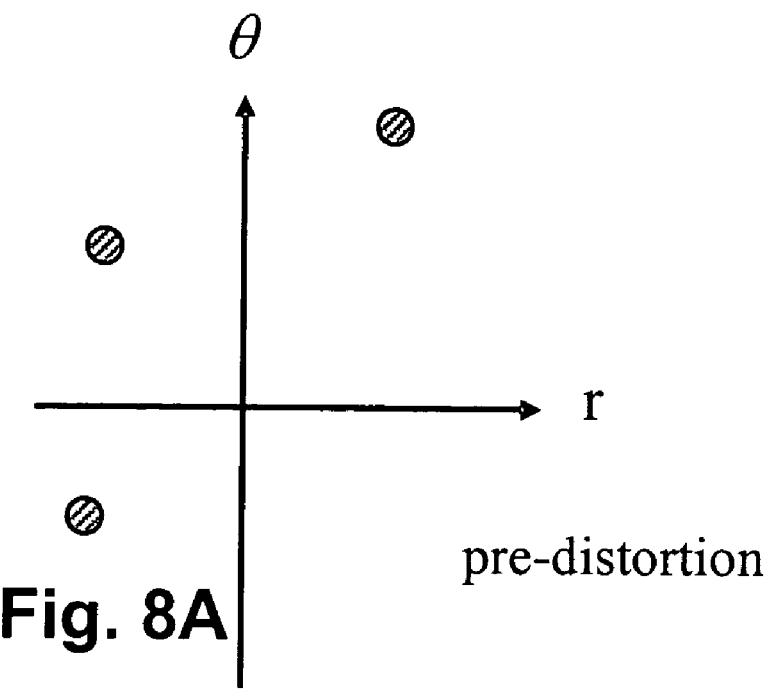
Fig. 8A  pre-distortion
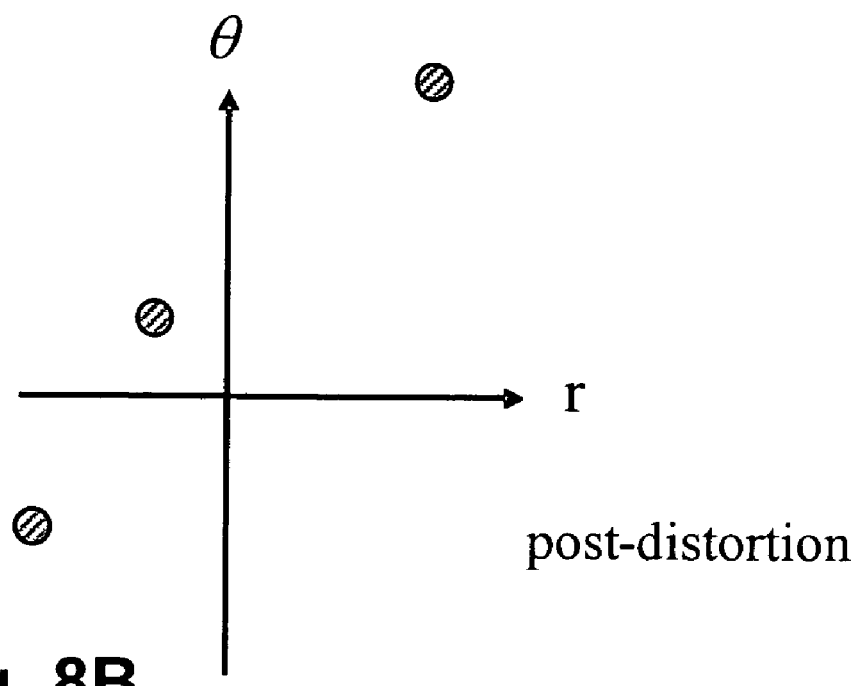
Fig. 8B  post-distortion

MARK EMBEDDING AND DETECTION USING PROJECTIVE TRANSFORMS

CROSS-REFERENCE TO RELATED PATENT APPLICATIONS

This application claims the right of priority under 35 U.S.C. § 119 based on Australian Patent Application No. 2002951815, filed on Oct. 3, 2002, which is incorporated by reference herein in its entirety as if fully set forth herein.

FIELD OF THE INVENTION

The present invention relates generally to the embedding and detection of watermarks in an image and, in particular, to the embedding and detection of patterns having variation in one direction only.

BACKGROUND

In the last decade, numerous schemes have been proposed for the imperceptible embedding and detection of marks in signals. For a mark to be imperceptible in a signal, such as an image or even a video, the mark is typically embedded at a very low level when compared with the signal. For such a low-level signal to be detectable, a highly efficient detection process is needed. Such a process exists in the form of correlation or "matched filtering" in the case where the process is an optimal linear detection.

Certain marks have near perfect correlation properties, allowing virtually all the energy of the mark to be concentrated into a single detection point. Unfortunately most correlation processes are effectively destroyed, or at least severely impeded, by distortions of the marked signal. In two dimensions, common distortions include rotation, scaling, anamorphic scaling and shear.

SUMMARY

It is an object of the present invention to substantially overcome, or at least ameliorate, one or more disadvantages of existing arrangements.

Disclosed are arrangements which seek to detect an embedded watermark, the watermark being formed from a one-dimensional function, even when the image including the watermark has been rotated, by applying a projective transform on the image, followed by correlation with the basis function.

According to an aspect of the present invention there is provided a method of detecting one or more patterns embedded in an image, each pattern having been formed substantially from a one-dimensional basis function, said method comprising the steps of:

(a) calculating a projective transform of said image;

(b) calculating a 1-D correlation between the projective transform and said basis function for a selection of angles; and (c) finding one or more peaks of said correlation, wherein the position of each of said peaks provides spatial parameters of one of said one or more embedded patterns.

Another aspect of the present invention provides a method of determining transformations applied to an image, said image having at least three patterns embedded therein, each pattern having been formed substantially from a one-dimensional basis function being substantially scale invariant as herein defined, said method comprising the steps of:

(a) calculating a projective transform of said image;

(b) calculating a 1-D correlation between the projective transform and said basis function for a selection of angles;

(c) finding peaks of said correlation, wherein the positions of said peaks provide spatial parameters of said embedded patterns; and (d) determining from said spatial parameters said transformations.

Another aspect of the present invention provides a method of detecting one or more patterns embedded in an image, each pattern having been formed substantially from a one-dimensional basis function, said method comprising the steps of:

transforming said image to the frequency domain using a two-dimensional transform;

resampling the transformed image onto a quasi-polar map;

transforming said basis function to the frequency domain using a one-dimensional transform;

multiplying the resampled transformed image with the transform of said basis function along radial lines to create a first result;

inverse transforming said first result to the space domain using a one-dimensional transform to create a second result; and finding one or more peaks of said second result, wherein the position of each of said peaks provides spatial parameters of one of said one or more embedded patterns.

Yet another aspect of the present invention provides a method of determining transformations applied to a first image, said first image being a transformed copy of a second image, said second image having at least three patterns embedded therein, each pattern having predefined parameters and having been formed substantially from a one-dimensional basis function being substantially scale invariant as herein defined, said method comprising the steps of:

calculating a projective transform of said first image;

calculating a 1-D correlation between the projective transform and said basis function for a selection of angles;

finding peaks of said correlation, each peak corresponding with one of said embedded patterns; and determining said transformations from the positions of said peaks and said parameters of said patterns embedded into said second image.

Yet another aspect of the present invention provides a method of embedding a watermark into an image, said method comprising the steps of:

maintaining a basis function, said basis function being a substantially scale invariant one-dimensional function excluding the function $f(r)=\cos(\alpha \log|r|+c)$ wherein a and c are constants;

forming one or more patterns from said basis function, each pattern having no variation in one direction; and adding said basis pattern(s) to said image.

Other aspects of the invention are also disclosed.

BRIEF DESCRIPTION OF THE DRAWINGS

One or more embodiments of the present invention will now be described with reference to the drawings, in which:

FIG. 8A illustrates 3 correlation peaks detected in an image having 3 embedded patterns with different parameters;

FIG. 8B illustrates the correlation peaks detected from a distorted version of the same image as that in used for FIG. 8A;

DETAILED DESCRIPTION INCLUDING BEST MODE

Figure 1A:
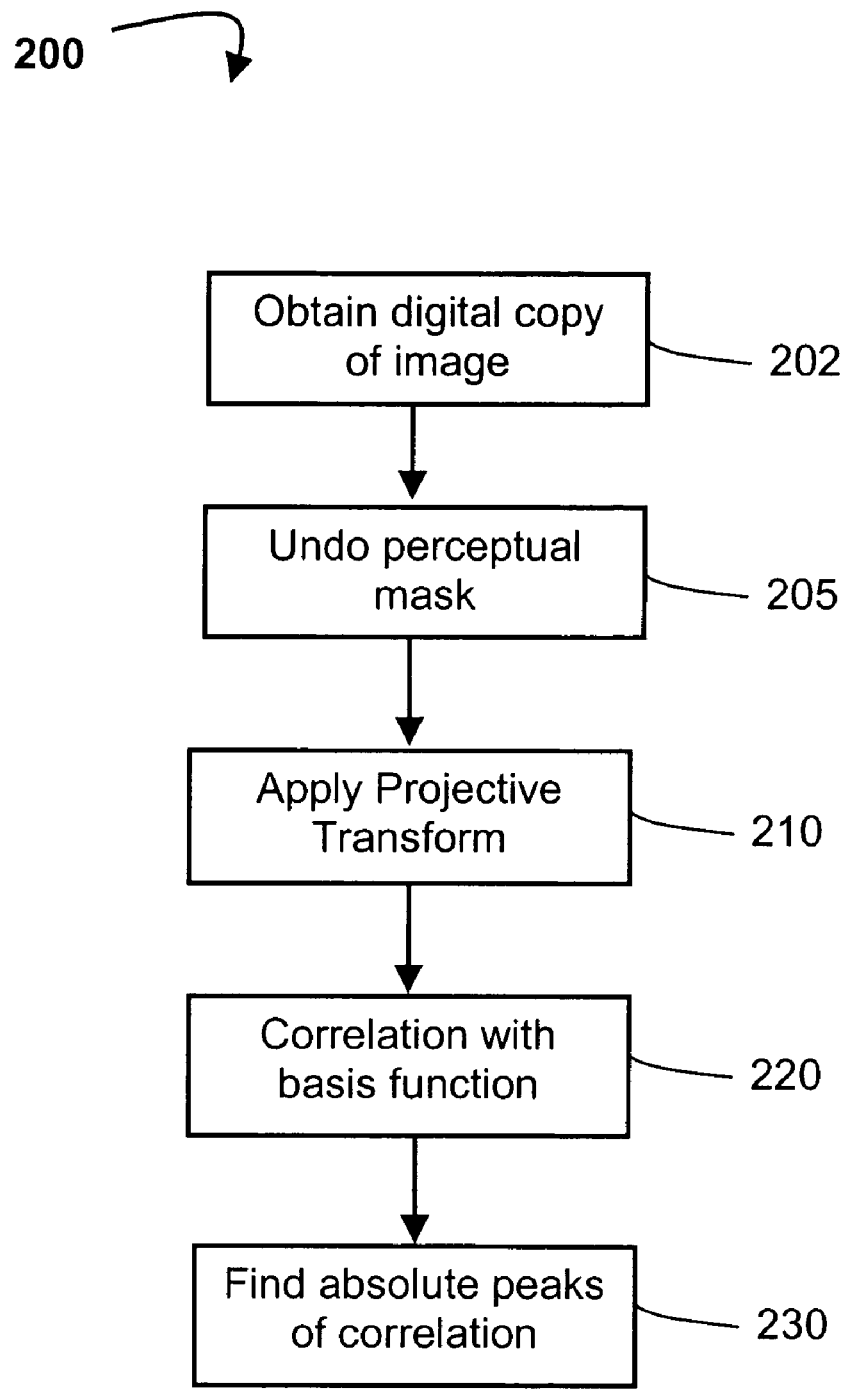
FIG. 1A shows a flow diagram of a method of detecting one or more patterns embedded in a two-dimensional function or signal.

Where reference is made in any one or more of the accompanying drawings to steps and/or features, which have the same reference numerals, those steps and/or features have for the purposes of this description the same function (s) or operation(s), unless the contrary intention appears.

Figure 2:
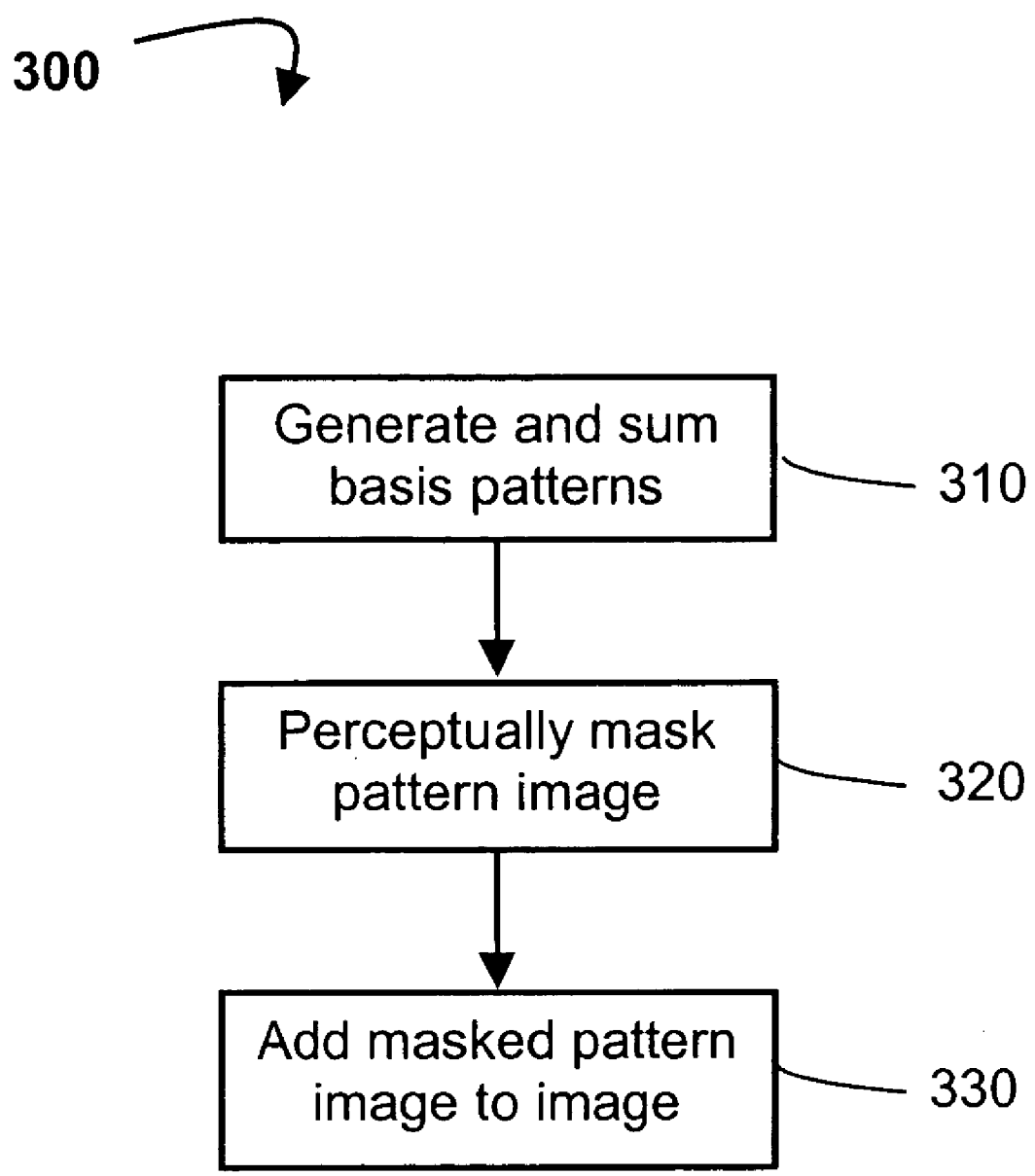
FIG. 2 shows a flow diagram of a method of embedding one or more patterns in the two-dimensional function.

FIG. 1A shows a flow diagram of a method 200 of detecting one or more patterns embedded in a two-dimensional function or signal, such as an image. Before describing the method 200 of detecting the patterns, a method 300 of embedding such patterns in the two-dimensional function will be described with reference to FIG. 2.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated within registers and memories of a computer system, or similar electronic device.

Figure 3:
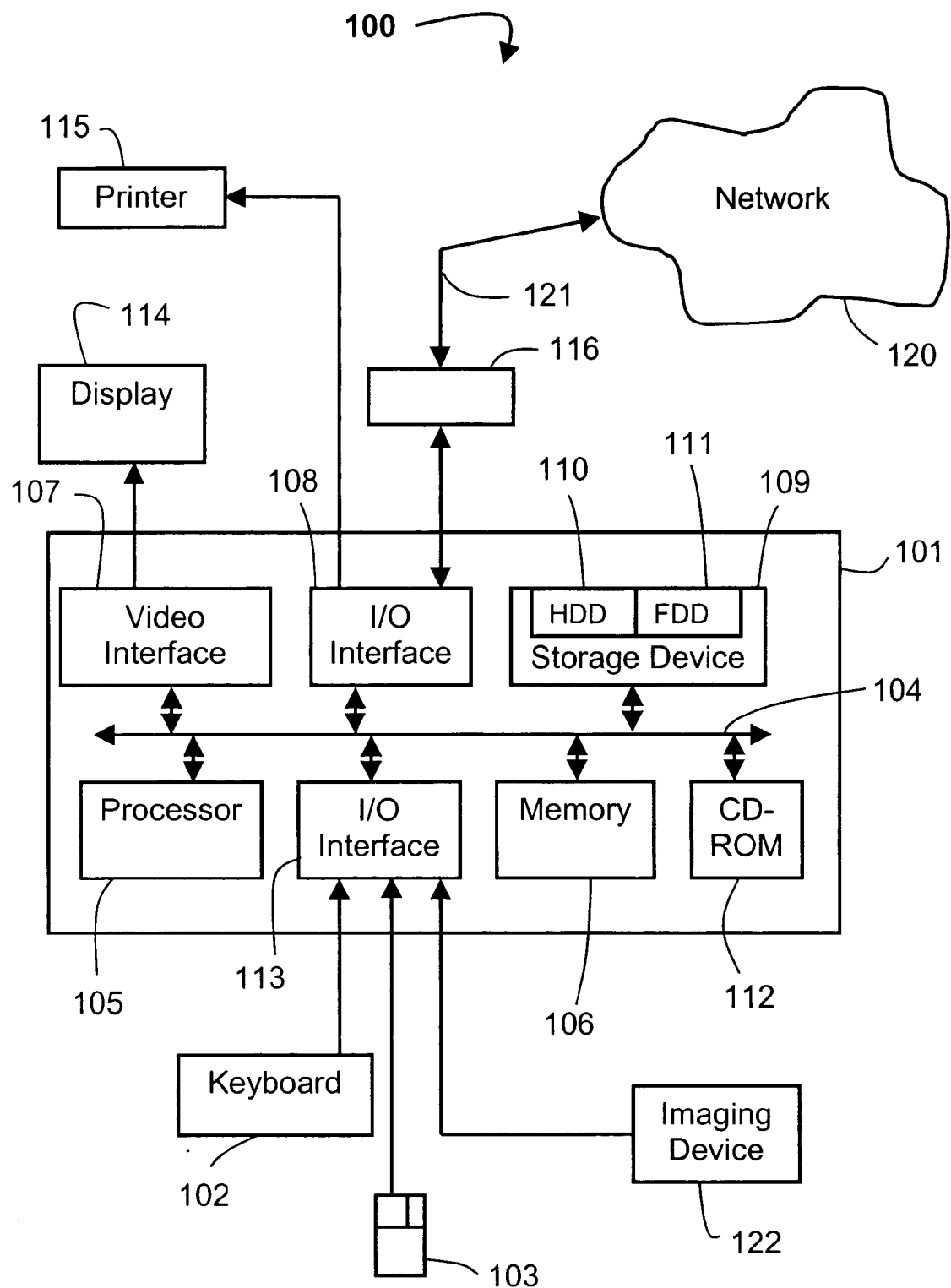
FIG. 3 shows a schematic block diagram of an apparatus for performing the operations of the above methods.

FIG. 3 shows a schematic block diagram of an apparatus in the form of a general-purpose computer system 100 for performing the operations of methods 200 and 300, wherein the steps of methods 200 and 300 may be implemented as software, such as one or more application program executing within the computer system 100.

In particular, the steps of methods 200 and 300 are effected by instructions in the software that are carried out by the computer system 100. The software may be stored in a computer readable medium, including the storage devices described below, for example. The software is loaded into the computer system 100 from the computer readable medium, and then executed by the computer system 100. The use of the software in the computer system 100 effects an advantageous apparatus for detecting one or more patterns embedded in a two-dimensional function, and an advantageous apparatus for embedding such patterns in the two-dimensional function.

The computer system 100 is formed by a computer module 101, input devices including a keyboard 102, a mouse 103 and an imaging device 122, and output devices including a printer 115 and a display device 114. The imaging device 122 may be a scanner or digital camera used for obtaining a digital image. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN), and may be incorporated into the computer module 101 in some implementations.

The computer module 101 typically includes at least one processor unit 105, and a memory unit 106, for example formed from semiconductor random access memory (RAM) and read only memory (ROM). The module 101 also includes a number of input/output (I/O) interfaces including a video interface 107 that couples to the video display 114, an I/O interface 113 for the keyboard 102, mouse 103 and imaging device 122, and an interface 108 for the modem 116 and printer 115. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including e-mail transmissions and information recorded on Websites and the like.

The methods 200 and 300 may alternatively be implemented in dedicated hardware such as one or more integrated circuits performing the functions or sub functions of methods 200 and 300. Such dedicated hardware may include graphic processors, digital signal processors, or one or more microprocessors and associated memories. In one implementation, such integrated circuits are included in an imaging device, such as a camera or scanner.

Referring again to FIG. 2, the method 300 of embedding patterns in the two-dimensional function starts in step 310 where a predetermined number of patterns are generated, each with predetermined parameters, and the separate patterns are summed together to form a pattern image. Such operations may be performed by the processor 105 under control of one or more application programs. The pattern image may be stored after generation in the memory 106 or HDD 110.

Each pattern has no variation in one direction only, that direction being perpendicular to an orientation angle $\beta_n$ with the horizontal direction. The pattern also has an axis, which may be an axis of symmetry or a nominated axis, which is parralel to the no-variation direction, and at a displacement $v_n$ from the centre of the pattern image.

The patterns are typically generated from a one-dimensional basis function applied at the direction of variation and repeated parallel to the axis.

In a preferred implementation, the basis function is a complex homogeneous function of the form:

$$g(r) = |r|^{p+i\alpha} = |r|^p \exp(i\alpha \log[|r|]) \quad (1)$$

where r is a one-dimensional coordinate, which is not necessarily positive, while $\alpha$ and p are constants. The basis function g(r) is preferably attenuated in areas where the basis function has a frequency above the Nyquist frequency of the pattern image. Further, the pattern generated from basis function g(r) has an axis of symmetry, which may be made odd or even symmetry. Equation (1) may be considered as an amplitude function, amplitude modulating a phase function, with the phase function having a logarithmic phase. When such a complex homogeneous function g(r) is scaled, say by a factor a, the scaling only introduces a complex constant factor as follows:

$$g(ar) = a^{p+i\alpha} g(r) \quad (2)$$

The advantage of the complex homogeneous function is that the auto-correlation of the complex homogeneous function is directly proportional to the cross-correlation of the complex homogeneous function with a scaled version of the complex homogeneous function. This 'scale-invariant' property allows a watermark to be detected in an image even after a scale transformation by correlating the image with the basis function.

In practice, a basis function useable as a scale invariant function only has to approximate this ideal property sufficiently so as to provide a dominant correlation peak. For example, a fractional power-phase function defined by:

$$\chi(r) = r^p \exp\left(i\frac{\alpha}{\gamma} r^\gamma\right) \quad (3)$$

has a phase derivative (i.e. instantaneous frequency) that is similar to that of the ideal homogeneous function for small fractional powers $\gamma$ in the range $|\gamma|<1$, $\gamma \neq 0$. The phase derivative of the fractional power-phase function $\chi(r)$ is:

$$\frac{d \arg[\chi(r)]}{dr} = \alpha r^{\gamma - 1}, \quad (4)$$

while the phase derivative of the ideal homogeneous function g(r) is:

$$\frac{d \arg[g(r)]}{dr} = \alpha r^{-1} \quad (5)$$

Figure 9:
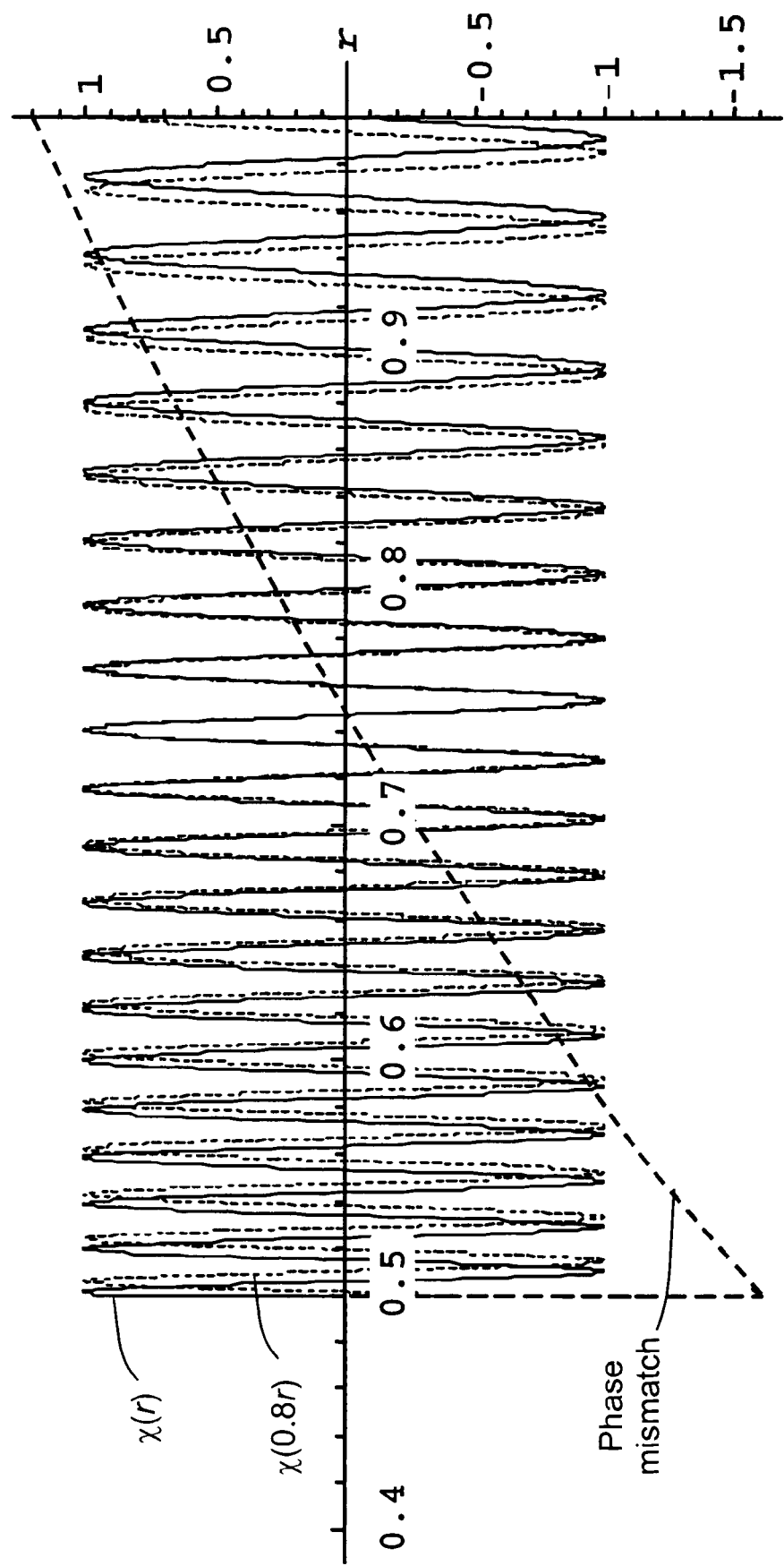
FIG. 9 shows a comparison between a fractional power-phase function $\chi(r)$ and a rescaled version $\chi(0.8r)$ thereof, as well as a phase mismatch between the functions.

FIG. 9 shows the real part of the fractional power-phase function $\chi(r)$ in the range (0.5, 1) as a continuous curve, and a version of the fractional power-phase function $\chi(r)$ rescaled by a factor of 0.8 as a dotted curve. The fractional power-phase function $\chi(r)$ has parameters p=0, $\alpha$=606$\pi$, and $\gamma$=0.1. The phase mismatch between the functions is also shown. The cross-correlation between the two functions illustrated will thus not be an ideal delta function, but rather some spread of energy around a point.

Figure 10:
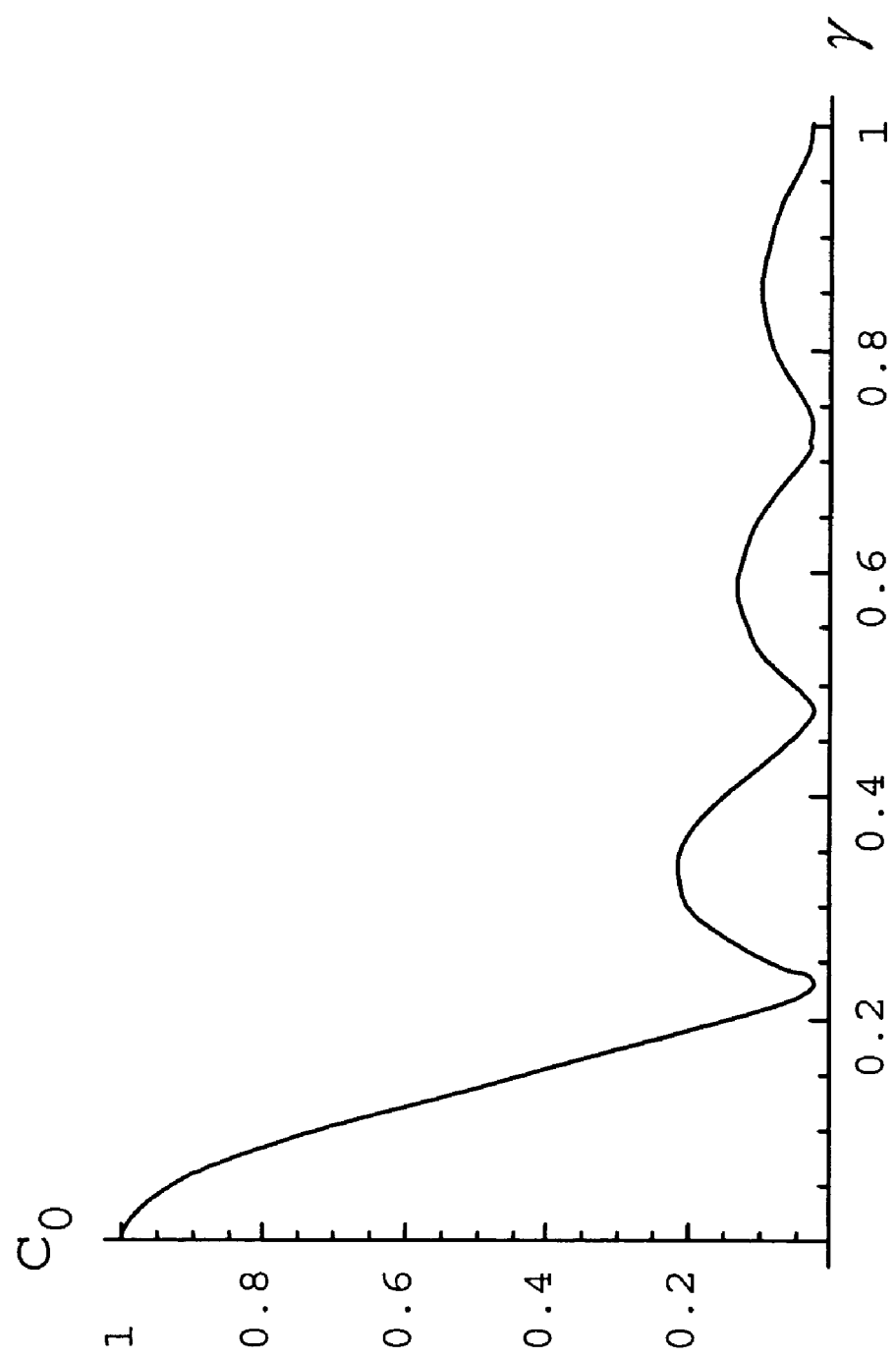
FIG. 10 shows a plot of how the magnitude of the cross-correlation of fractional power-phase functions $\chi(r)$ and $\chi(0.8r)$ varies as a function of the fractional power $\gamma$.

FIG. 10 shows a plot of how the magnitude of the cross-correlation of fractional power-phase functions $\chi(r)$ and $\chi(0.8r)$ varies as a function of the fractional power $\gamma$. It can be observed from the plot that the correlation drops from about 70% at $\gamma$=0.1 to near 0% at $\gamma$=0.2.

Generally, a measure of a function's scale invariance is equivalent to how well the phase profile of the function matches that of the original after scaling.

The ideal cross-correlation or overlap integral for a nominally orthogonal 1-D function with inverse square root weighting, as is the case for the function in Equation (3) with p=−0.5, is as follows:

$$c_0 = \frac{1}{\ln(r_2 / r_1)} \int_{r_1}^{r_2} \frac{1}{r} \exp[i\psi(r)] dr \quad (6)$$

wherein $\psi(r)$ is a phase mismatch function. For two perfect phase matched functions the phase mismatch function $\psi(x) \equiv 0$, and the correlation is not attenuated. For small phase errors, that is the phase mismatch function $|\psi(x)|<1$, the cross-correlation energy is as follows:

$$|c_0|^2 \approx \left| \frac{1}{\ln(x_2 / x_1)} \int_{x_1}^{x_2} \frac{1}{x} \left[ 1 + i\psi(x) + \frac{\{i\psi(x)\}^2}{2} + \ldots \right] dx \right|^2 \quad (7)$$

Ignoring third and higher powers, and defining weighted phase statistics as:

$$\overline{\psi^n} = \frac{1}{\ln(x_2/x_1)} \int_{x_1}^{x_2} \frac{\psi^n(x)}{x} dx \qquad (8)$$

then Equation (7) may be simplified to:

$$|c_0|^2 \approx \left[1 + i\overline{\psi^1} - \frac{\overline{\psi^2}}{2}\right]^2 = 1 + \left(\overline{\psi^1}\right)^2 - \overline{\psi^2} + \frac{\left(\overline{\psi^2}\right)^2}{4} \qquad (9)$$

Ignoring the last term, this may be expressed as:

$$|c_0|^2 \approx 1 - \left\{\overline{\psi^2} - \left(\overline{\psi^1}\right)^2\right\} = 1 - \sigma^2 \qquad (10)$$

wherein σ is the weighted root mean square phase mismatch. It is noted that other weighting, that is other than $1/\sqrt{r}$, may be applied to the phase statistics in Equation (8) if the need arises.

Preferably, the phase profiles of the unscaled and the scaled basis function match (apart from a constant or linear term) within a RMS of 0.7 radian. In such a case, the cross-correlation will not be attenuated by more than 30% when compared with the ideal. Table 1 sets out the magnitude of the correlation for different values of the RMS phase mismatch σ.

TABLE 1

| RMS phase mismatch σ | Correlation $|c_0| \approx \sqrt{1-\sigma^2}$ |
|---|---|
| 0 | 1.00 |
| 0.1 | 0.99 |
| 0.2 | 0.98 |
| 0.3 | 0.95 |
| 0.4 | 0.92 |
| 0.5 | 0.87 |
| 0.6 | 0.80 |
| 0.7 | 0.71 |
| 0.8 | 0.60 |
| 0.9 | 0.44 |

Other basis functions include:

$$q_1(r) = [\text{sgn}(r)]^k \exp(i(\alpha r^{-p} + \epsilon)); \qquad (11)$$

$$q_2(r) = \sum_{n=N_1}^{N_2} \xi_n q_0(|\mu|^n r); \text{ and} \qquad (12)$$

$$q_3(r) = [\text{sgn}(r)]^k r^p \exp\left(i\frac{\alpha}{\gamma}r^\gamma\right) \qquad (13)$$

where $\epsilon$, p, $N_1$, $N_2$, $\xi_n$, $\alpha$, k and $\mu$ are constants and the function $q_0$ is an arbitrary function. The constant $\mu$ is preferably in the range 0.5 to 2, but excluding 1. The constant k=0 or 1. In the case where k=0, the function $q_3(r)$ has even symmetry, whereas in the case where k=1, the function $q_3(r)$ has odd symmetry.

Figure 4A:
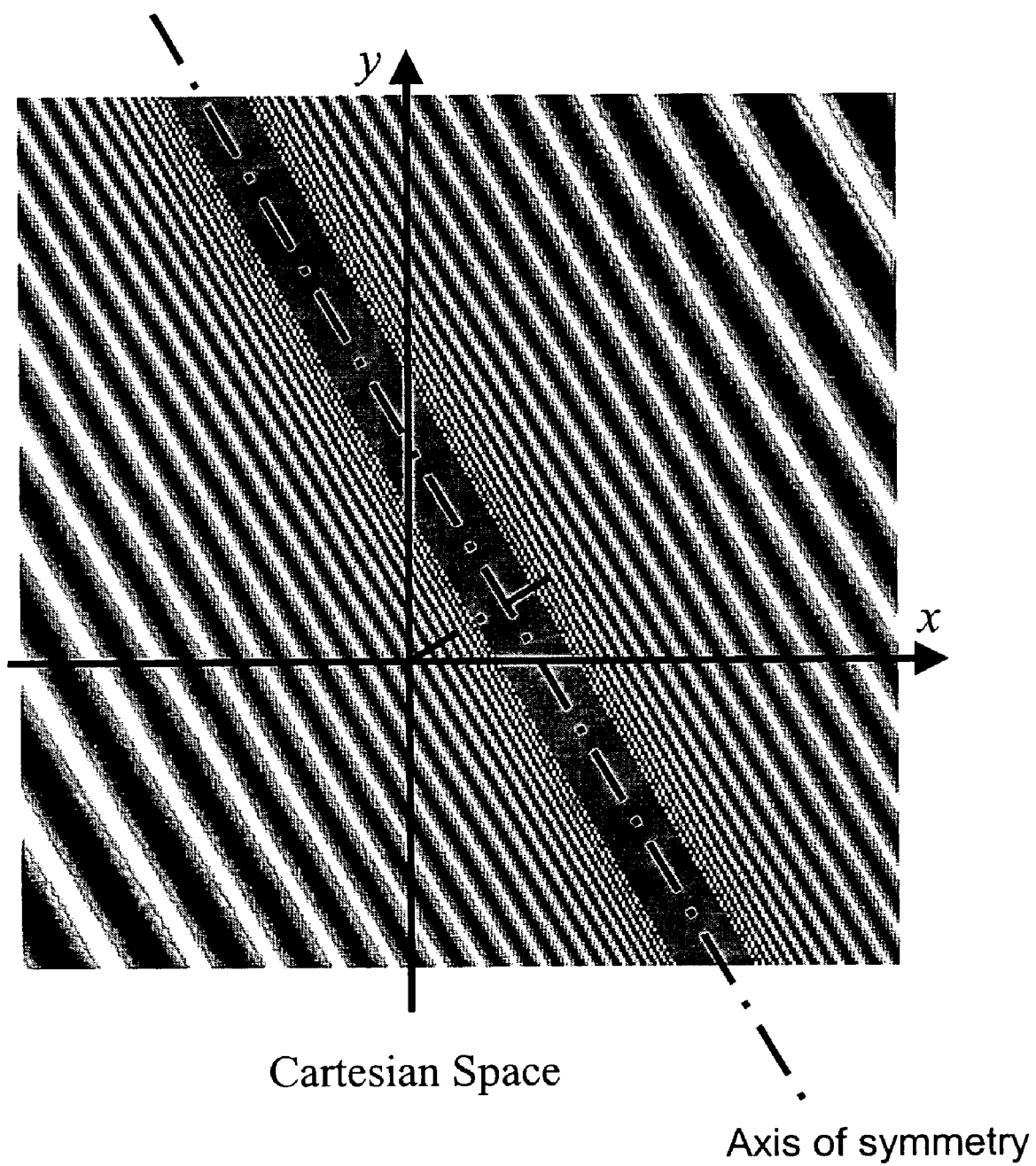
FIG. 4A illustrates an example pattern.
Figure 4B:
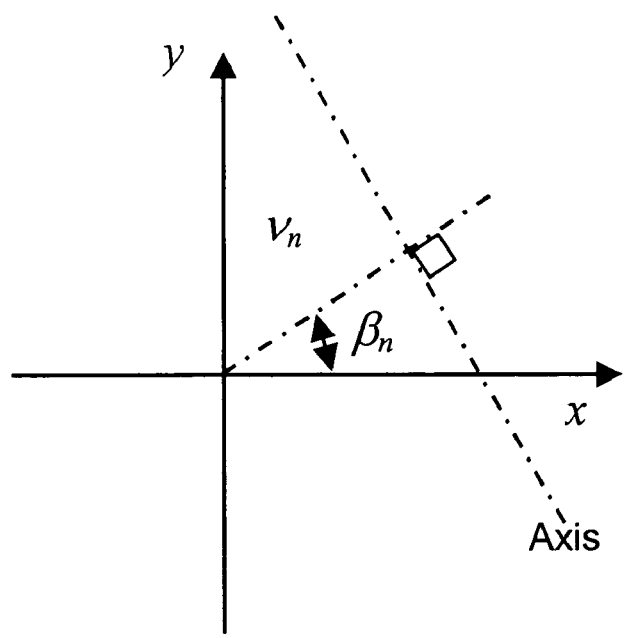
FIG. 4B illustrates the axis of symmetry of the pattern illustrated in FIG. 4A together with the orientation angle and perpendicular displacement from the centre of the pattern image.

FIG. 4A illustrates an example pattern generated using a real part of the basis function of Equation (1), with masking applied at the area adjoining the axis of symmetry to remove values with a frequency above the Nyquist frequency of the pattern image. In illustrating the example pattern, pattern values have been mapped to values in the range of [0, 255], with a value of 0 being represented as the colour black and a value of 255 being represented as the colour white. FIG. 4B illustrates the axis of symmetry of the pattern illustrated in FIG. 4A together with the orientation angle $\beta_n$ and perpendicular displacement $v_n$ from the centre of the pattern image.

Referring again to FIG. 2, in order to embed patterns that are imperceptible to a human observer, the pattern image is retrieved from the memory 106 and is perceptually masked in step 320 by the processor 105 in order to greatly reduce the levels of the patterns corresponding to regions of the image having low intensity variation, and reduce by a lesser amount the levels of the patterns corresponding to regions of the image having high intensity variarion. An example measure of intensity variation is the local gradient magnitude of the luminance in the image. Other measures include second partial derivatives of the luminance; local estimates of the "energy" or frequency content, local variance, and more sophisticated estimates of human visual system masking.

The perceptually masked pattern image, which may be called a watermark, is added to the two-dimensional function, such as an image, in step 330. If the image is a colour image, then the watermark is preferably added to the luminance part of a colour image. This allows the watermark to survive when the watermarked image is converted from colour to a greyscale representation. Alternatively, the watermark may be added to one or more of the R, G, B, H, V, S, u, v etc channels of the colour image, or any combination thereof. Apart from simple algebraic addition, addition of the watermark to the image also includes dithering and half-toning. The real and imaginary parts of a complex basis function may be added independently to two or more channels of the colour image. Watermarks may also be applied to sequences of images such as video streams by sequential addition.

The image with the embedded watermark may be stored on storage device 109 (FIG. 3) in a digital image format, such as tiff, gif, jpeg, mpeg etc. The watermarked image may also be printed on printer 115 (FIG. 3) to create a hardcopy of the watermarked image, or may be communicated to another computer module 101 using the network 120.

Referring again to FIG. 1A where the flow diagram of the method 200 of detecting one or more patterns embedded in an image is shown, with the patterns embedded in the image using the method 300 (FIG. 2) described above. Method 200 starts in step 202 where a digital copy of the image is obtained. Typically the image may already be in a digital image format and stored on storage device 109 (FIG. 3). In such cases the image is converted to an array of pixel values. If the image is still in a hardcopy format, such as a photograph, then the hardcopy image is first converted into a digital format by scanning the hardcopy using the imaging device 122 (FIG. 3).

Step 205 follows where the processor 105 undoes the perceptual masking by first forming a perceptual mask from the image, and then emphasising the image with the perceptual mask by dividing the values of the image by the corresponding values of the perceptual mask.

Figure 5:
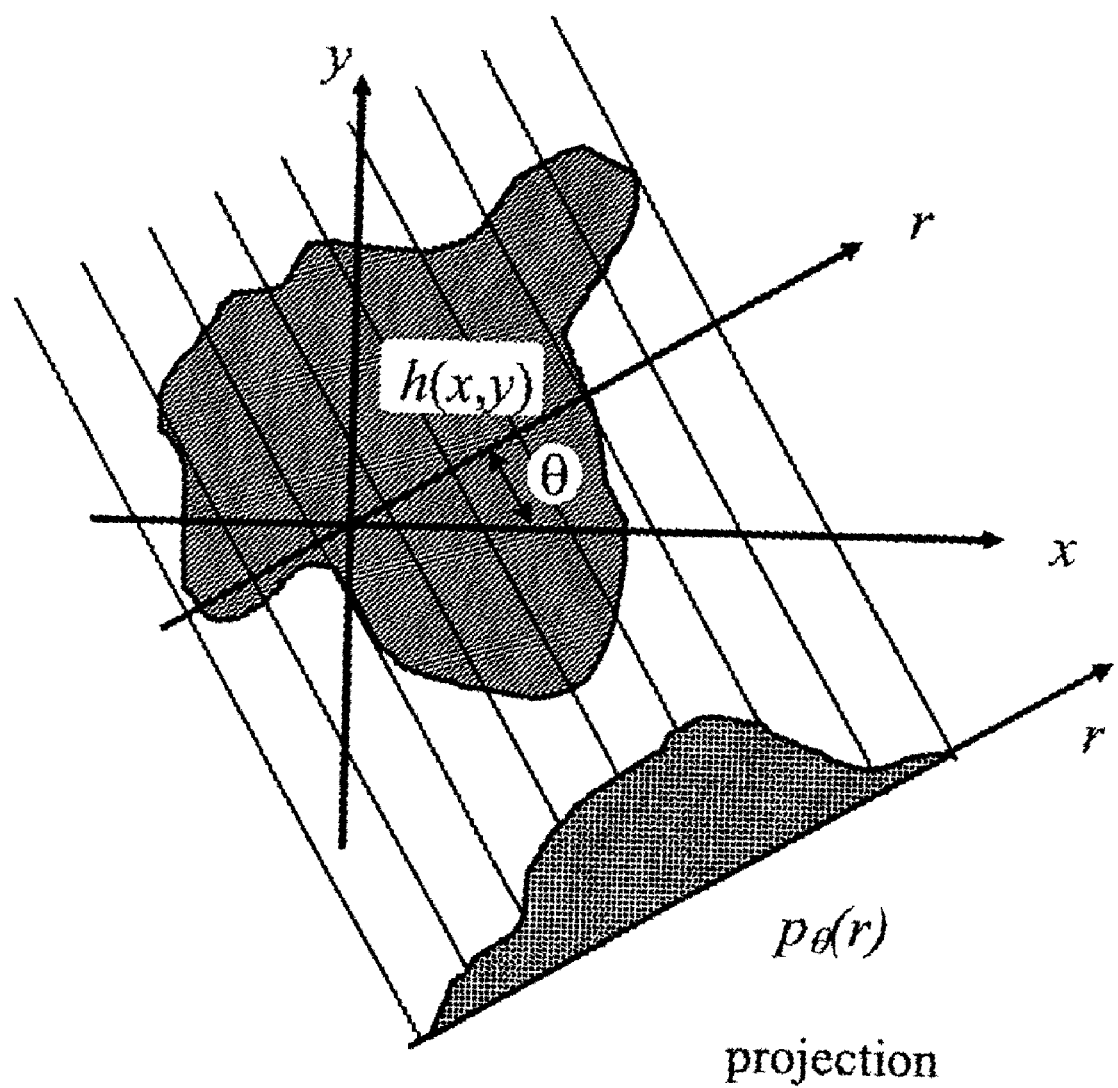
FIG. 5 illustrates the operation of the projective transform.

A projective transform is then applied to the resulting image in step 210. The projective transform accumulates energy by summing values along straight lines in the image. This is similar to the way that the total effective path of X-rays accrues during transmission through a patient's body. FIG. 5 illustrates the operation of the projective transform in that a projection of the values of a function h(x,y) is accumulated along straight lines with an angle θ with the vertical direction to form a projection $p_\theta(r)$. The projection $p_\theta(r)$ is found for a selection of projection angles θ in the range (-π,π], or possibly (-π/2, π/2).

The Radon (or equivalently Hough) transform is one such projective transform that may be used in step 210 and is defined as:

$$R_\theta\{h(x, y)\} = p_\theta(r) \quad (14)$$

$$= \int_{-\infty}^{+\infty}\int_{-\infty}^{+\infty} h(x, y)\delta(r - x\cos\theta - y\sin\theta)\,dx\,dy$$

In order to derive a convenient implementation of the Radon transform for a discrete dataset, a useful correspondence between the projection $p_\theta(r)$ of 2-D function h(x,y) and the slices of the function's Fourier transform is used, that correspondence being known as the "projection-slice theorem".

The projection-slice theorem states that the one-dimensional Fourier transform of a projection of a two dimensional function is equal to a radial slice of the two-dimensional Fourier transform of that function. Hence:

$$H(u, v) = \int_{-\infty}^{+\infty}\int_{-\infty}^{+\infty} h(x, y)\exp[-2\pi i(ux + vy)]\,dx\,dy \quad (15)$$

wherein H(u,v) is the 2-D Fourier transform of function h(x,y). In the quasi polar space the angles are in the range (-π/2,π/2], while distance is in the range (-∞,∞). By defining quasi-polar coordinates (q,φ) in the Fourier domain, the coordinate transform is u=q cos φ, v=q sin φ, and one form of the projection-slice theorem is obtained for the Fourier polar angle corresponding to the Radon projection angle φ=θ as follows:

$$\int_{-\infty}^{+\infty} p_\theta(r)\exp[-2\pi i(rq)]\,dr = H(q\cos\theta, q\sin\theta) = P_\theta(q) \quad (16)$$

Equation (16) is useful because it allows estimation of (the Fourier transform of) a Radon projection as a radial slice of the 2-D-FFT of a discrete image. This suggests that a discrete Radon transform may be evaluated by first performing a 2-D FFT followed by a Cartesian to polar remapping, using a suitable interpolation—such as bicubic, or chirp-z—to perform the resampling.

A two-dimensional function h(x,y) formed from a one-dimensional basis function g(r) (e.g. Equation (1)) having an orientation angle $\beta_n$ and perpendicular displacement $v_n$ may be written as:

$$h(x,y)=g(x\cos\beta_n+y\sin\beta_n-v_n) \quad (17)$$

The two-dimensional function h(x,y) formed from the complex homogeneous function of Equation (1) may be written in an even form $h^+$ and an odd form $h^-$ as follows:

$$h_{p\alpha\beta}^+(x,y)=|x\cos\beta_n+y\sin\beta_n-v_n|^{p+i\alpha} \quad (18)$$

$$h_{p\alpha\beta}^-(x,y)=\operatorname{sgn}(x\cos\beta_n+y\sin\beta_n-v_n)|x\cos\beta_n+y\sin\beta_n-v_n|^{p+i\alpha} \quad (19)$$

Linear combinations of the functions in Equations (18) and (19) may also be used. Note that a one-sided function is obtained from adding an odd and even function in equal proportion.

Figure 6:
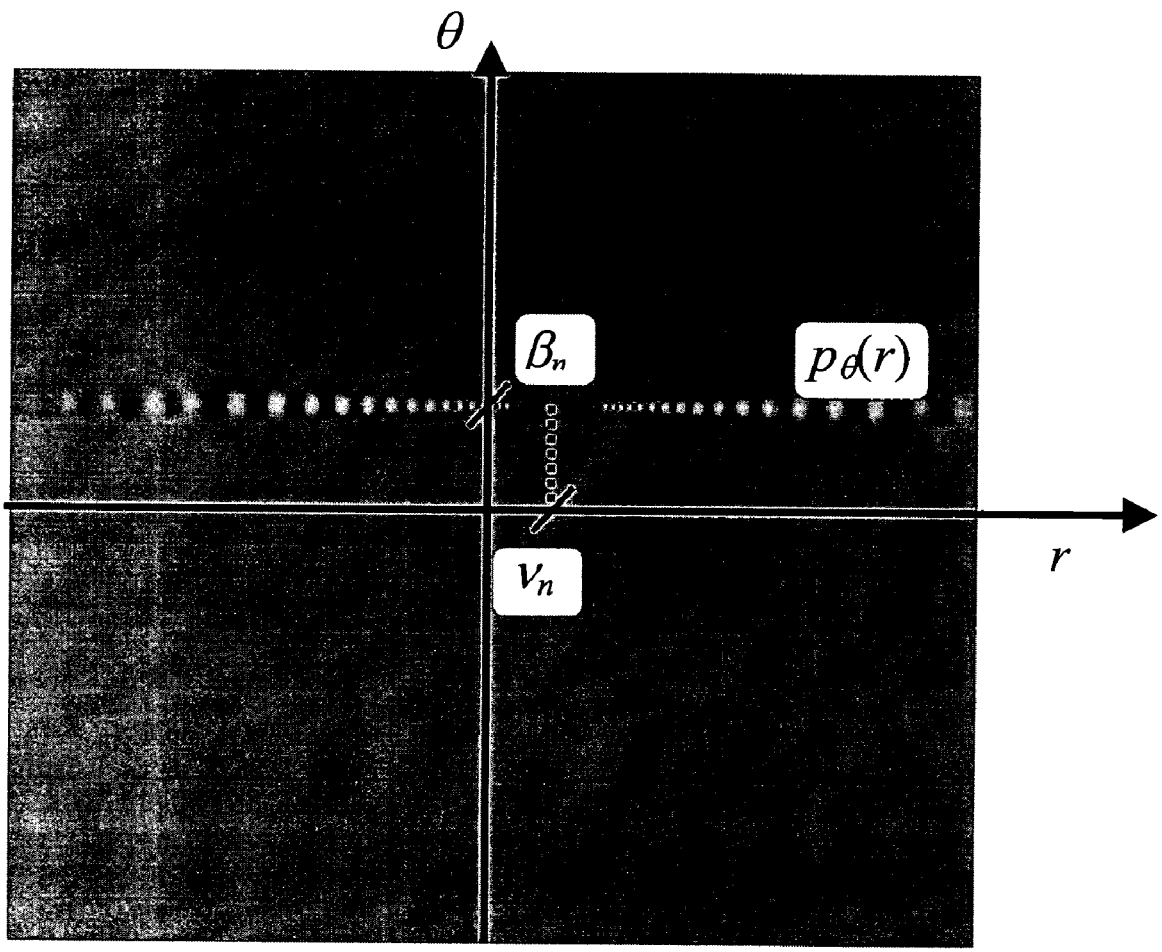
FIG. 6 illustrates the projection $p_\theta(r)$ of the example pattern illustrated in FIG. 4A plotted in the quasi polar space.

When the projection transform is applied to a pattern h(xy) having a variation in only one direction with that direction being at an orientation angle $\beta_n$ with the horizontal direction, then the values of the projection $p_\theta(r)$ are significantly higher when the angle θ is equal to the orientation angle $\beta_n$ compared to all other values of angle θ. FIG. 6 illustrates the projection $p_\theta(r)$ of the example pattern illustrated in FIG. 4A plotted in the quasi-polar space. It can be seen that the values of the projection $p_\theta(r)$ are significantly higher when the angle θ is equal to the angle $\beta_n$. The projection $p_\theta(r)$ also has even or odd symmetry about the offset distance $v_n$.

Hence, by applying the Radon transforms on the functions in Equations (17), (18) and (19), it can be shown that the Radon transform of such a function is constrained to a line where θ=β as shown in the following:

$$\rho(r,\theta)=R_\theta\{h(x,y)\}=g(r-v_n)\delta(\theta-\beta_n) \quad (20)$$

$$\rho^+(r,\theta)=R_\theta\{h_{p\alpha\beta}^+(x,y)\}=|r-v_n|^{p+i\alpha}\delta(\theta-\beta_n) \quad (22)$$

$$\rho^-(r,\theta)=R_\theta\{h_{p\alpha\beta}^-(x,y)\}=\operatorname{sgn}(r-v_0)|r-v_n|^{p+i\alpha}\delta(\theta-\beta_n) \quad (22)$$

Having concentrated a two-dimensional function h(x,y) formed from an one-dimensional basis function g(r) onto a single line in quasi-polar space by the use of Radon transform, it is further possible to concentrate the function's energy into a single point (or into a small region near a point) by using 1-D correlation detection. If the two-dimensional function h(x,y) is formed from an one-dimensional basis function g(r) having scale invariant properties as herein defined, then the correlation detection will be scale invariant. If the watermark includes several basis patterns at different (and in general unknown) angles $\beta_n$, then the basis patterns may be detected by repeating 1-D quasi-radial correlations (in coordinate r) for all values of the polar angle θ. As with other correlations and convolutions, a series of 1-D correlations may be efficiently implemented by use of discrete FFT algorithms, specifically using 1-D FFTs of 2-D functions along the radial axis.

In the case of Equation (21), the 1-D correlation (symbol ⊗) of a 2-D function using the dummy radial coordinate η is as follows:

$$c^+(r, \theta) = \int_{-\infty}^{+\infty} |\eta - r|^{p-i\alpha}\rho^+(\eta, \theta)\,d\eta \equiv |r|^{p+i\alpha} \otimes \rho^+(r, \theta) \quad (23)$$

The correlation function $c^+(r,\theta)$ is a highly concentrated function of both r and θ. With the preferred parameter p=-1/2, the correlation function $c^+(r,\theta)$ has good orthogonality properties. For parameter p≈-1 the correlation function $c^+(r,\theta)$ resembles a near perfect delta spike function $\delta(r-v_n)\delta(\theta-\beta_n)$. A near perfect delta-like result may also be advantageously achieved by the use of phase-only-correlation.

Similarly for the odd form $h^-$ (Equation (19)), the 1-D correlation is:

$$c^-(r, \theta) = \int_{-\infty}^{+\infty} sgn(\eta - r)|\eta - r|^{p-i\alpha} \rho^-(\eta, \theta)d\eta \equiv (sgn(r)|r|^{p+i\alpha}) \otimes \rho^-(r, \theta) \quad (24)$$

The more general correlation of the pattern h(x,y) expressed in Equation (17) is:

$$c(r, \theta) = \int_{-\infty}^{+\infty} g^*(\eta - r)\rho(\eta, \theta)d\eta \equiv g(r) \otimes \rho(r, \theta) \quad (25)$$

where the asterisk denotes complex conjugation.

Figure 7:
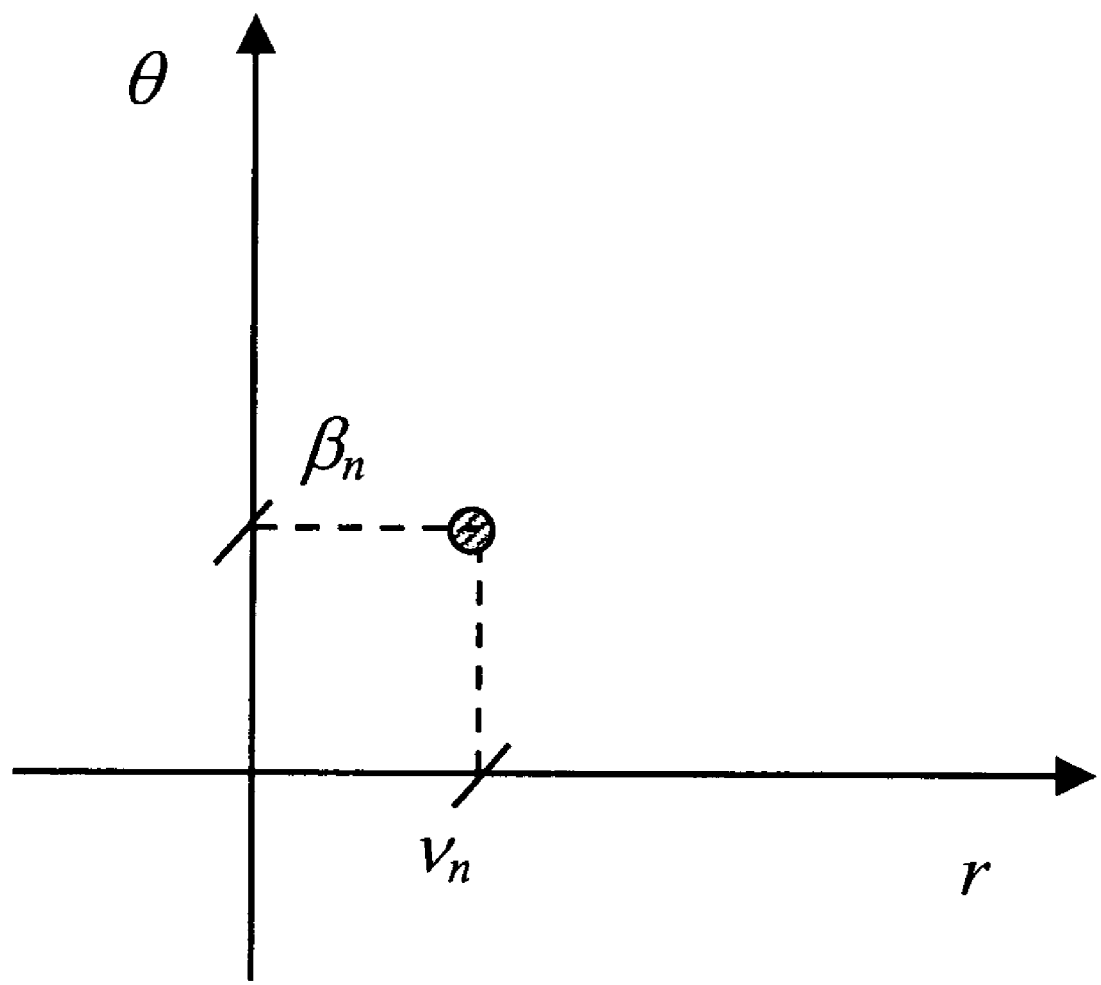
FIG. 7 illustrates a resulting correlation of the 1-D correlation between the projection $p_\theta(r)$ illustrated in FIG. 6 and an associated basis function.

Step 220 follows where the processor 105 performs a 1-D correlation between the projection $p_\theta(r)$ and the basis function in the quasi-radial coordinate r for all possible values of the polar angle θ. If the basis function is a complex function, such as that in Equation (1), then the complex basis function is preferably correlated with the (real) projection $p_\theta(r)$. The term "correlation" also includes phase correlation and phase correlation scaled by energy. The resulting correlation has a peak at quasi-polar coordinates $(v_n, \beta_n)$ for each embedded pattern. The result of the 1-D correlation between the projection $p_\theta(r)$ illustrated in FIG. 6 and the basis function of Equation (1) is illustrated in FIG. 7.

Finally, in step 230 the processor 105 finds the absolute peaks of the correlation. The orientation angle $\beta_n$ and perpendicular displacement $v_n$ of each embedded pattern is directly available from the quasi-polar coordinates $(v_n, \beta_n)$ of the peaks.

Figure 1B:
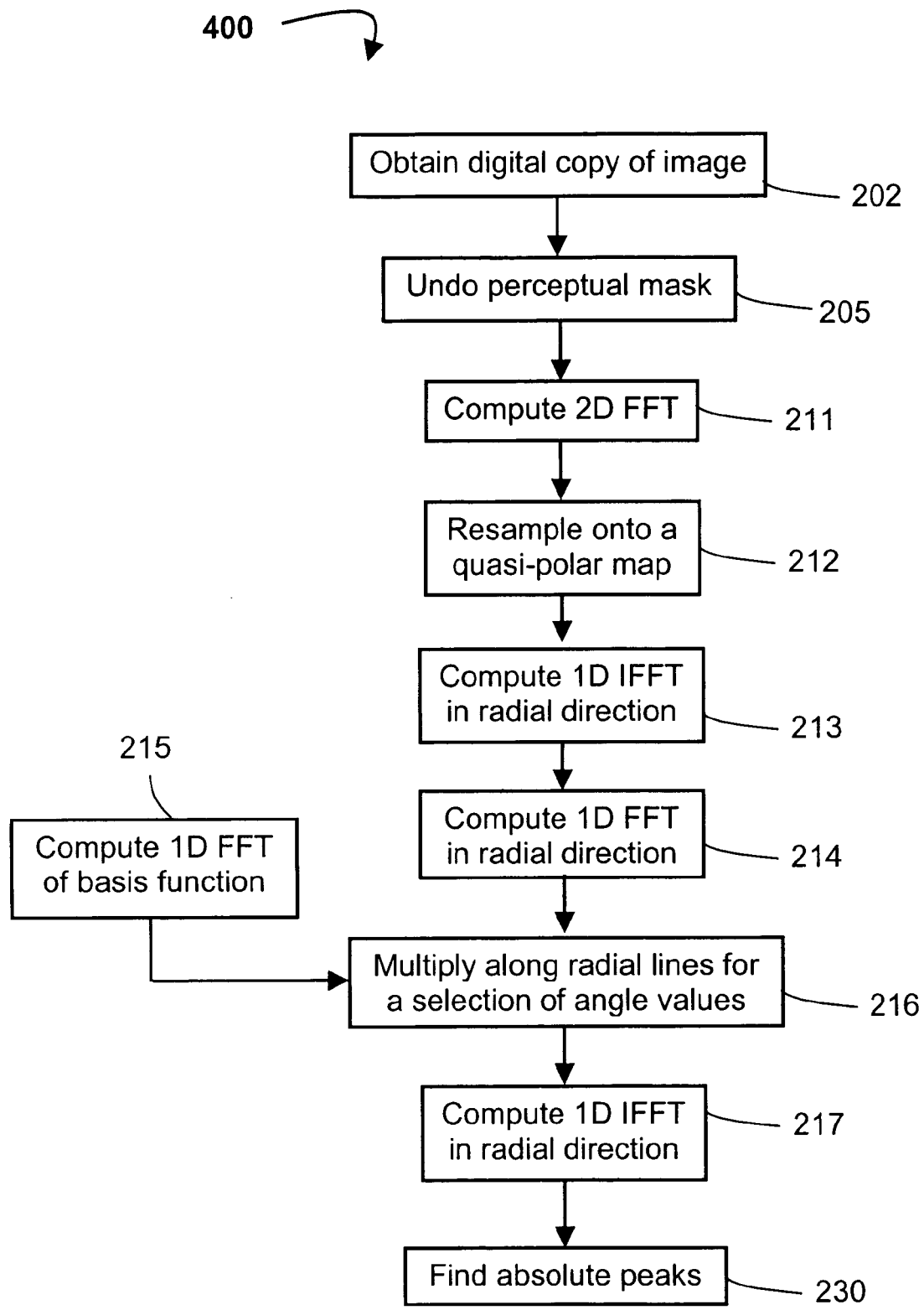
FIG. 1B shows a flow diagram of a method, which is an implementation of the method shown in FIG. 1A of detecting one or more patterns embedded in an image.

FIG. 1B shows a flow diagram of a method 400, which is an implementation of the method 200 (FIG. 1A) of detecting one or more patterns embedded in an image. In this implementation, the Radon transform is used as the projective transform, and is implemented by resampling in the frequency domain. The correlation with the basis function (step 220, FIG. 1A) is also performed by multiplication in the frequency domain.

Method 400 starts by the processor 105 performing steps 202 and 205, which are the same as those of method 200 described above.

The processor 105 then computes in step 211 the 2-dimensional Fast Fourier transform (FFT) of the image. Preferably, before computing the FFT, the image values (intensities) near the image edges are first attenuated by the processor 105 so that the image values fade to zero gradually and smoothly towards the edges of the image. Those skilled in the art of image processing are well aware of such preprocessing steps.

Step 212 follows where the values of the transform, which are in the Cartesian frequency space, are resampled by the processor 105 onto the quasi-polar Frequency space. It is noted that the angular spacing and the radial scaling need not be constant. A 1-dimensional inverse Fast Fourier transform (IFFT) in the radial direction of the remapped transform of the image is calculated by the processor 105 in step 213 for all desired angle values. This provides the Radon transform of the image, which is equivalent to the output of step 210 of method 200 (FIG. 1A).

Method 400 continues in step 214 where a 1-dimensional FFT in the radial direction of the Radon transform is calculated by the processor 105 for all desired angle values. In addition, in step 215, the 1-dimensional FFT of the (one-dimensional) basis function is calculated by the processor 105. Alternatively, the basis function may be mathematically transformed. The processor 105 next multiplies the transform of the basis function in step 216 with values of the output of step 214 along constant radial lines for all angle values. The IFFT in the radial direction of the output of step 216 is then calculated by the processor 105 in step 217. Steps 214 to 217 are the frequency space equivalent of step 220 in method 200 (FIG. 1A), and the output of step 217 is the same as that of step 220. Finally, the processor 105 finds the absolute peaks of the correlation in step 230 in the manner described in relation to FIG. 1A.

Figure 1C:
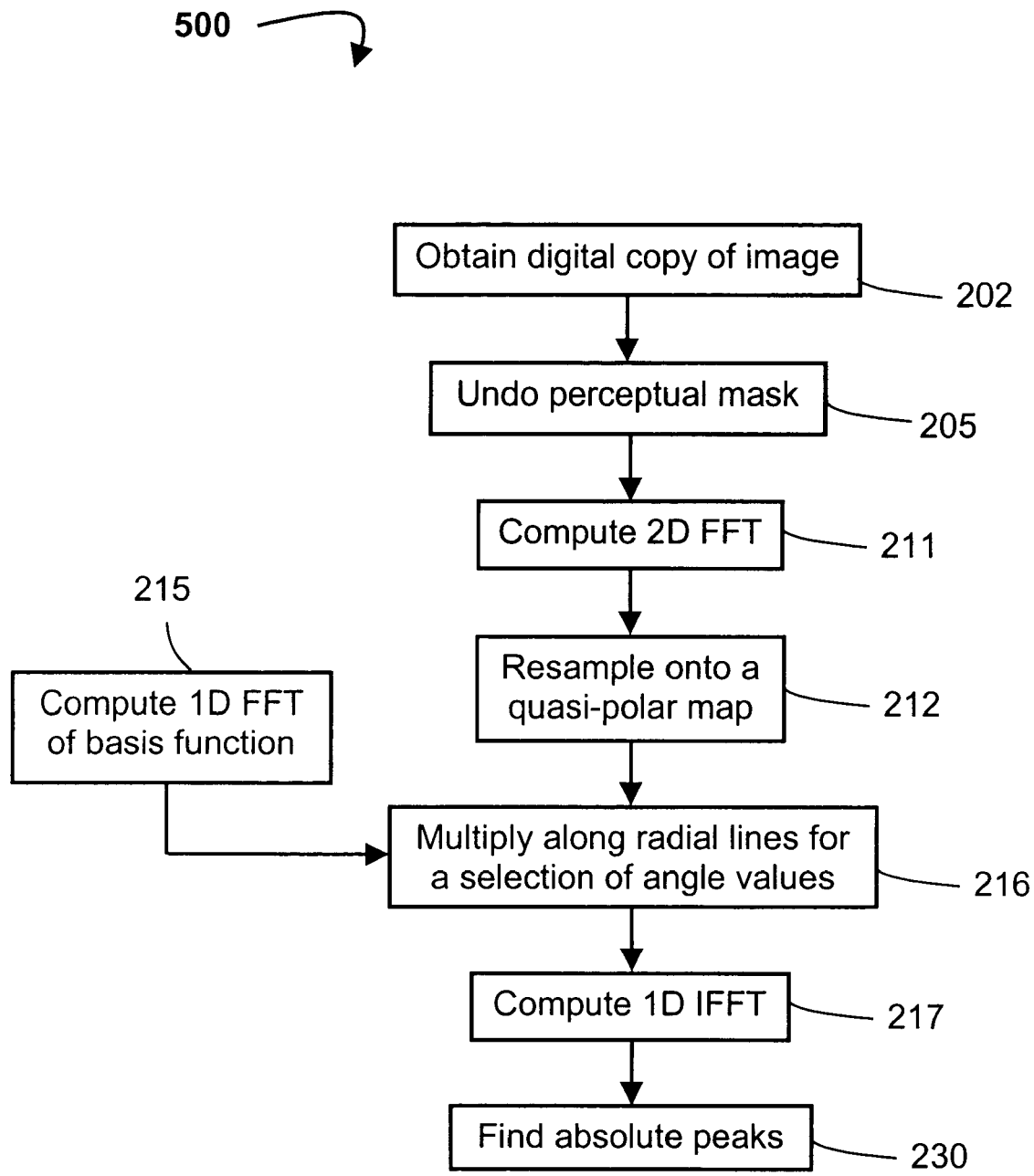
FIG. 1C shows a flow diagram of a method, which is another implementation of the method shown in FIG. 1A.

FIG. 1C shows a flow diagram of a method 500, which is another implementation of the method 200 (FIG. 1A) of detecting one or more patterns embedded in an image. The steps of method 500 are the same as those of method 400 (FIG. 1B) except, because steps 213 and 214 effectively cancel each other out, those steps are not performed in method 500. Accordingly, the steps of method 500 have descriptions corresponding to those described above.

If a pattern is embedded a substantial distance from the centre of an image, or if an image is cropped substantially so that the embedded pattern is significantly decentred, then the correlation peak may suffer noticeable degradation and asymmetry. Substantial degradation can prevent successful detection of an underlying peak. To counteract the reductions in peak detectability it can be advantageous to use the Hilbert transform detection technique. For 1-D scale invariant patterns the Hilbert transform relation is particularly simple owing to an unusual self-Hilbert transform relationship. In practice the Hilbert technique simplifies in this case to correlating the bilateral (i.e two-sided) real embedded pattern with two separate complex, and one-sided detection templates. In practice two complex correlations are carried out with one-sided complex templates that are mirror reflections of each other. The square correlation magnitudes are then added together to give the overall correlation magnitude squared. The one-side correlations have straightforward interpretations in the Fourier domain (as Hilbert transforms) which allows efficient implementation by direct use of the Hilbert transforms.

Methods 200, 400 and 500 will detect patterns even if the watermarked image is rotated. In order for the detection to detect the patterns after scaling, anamorphic scaling and shear, patterns with scale invariant correlation properties, as described hereinbefore, have to be used.

However, true scale invariance is an ideal, and is only achievable (within a complex constant factor) for complex functions of infinite extent in the spatial direction. Typically, an embedded watermark is realised as a real function of limited extent. The limit in spatial extent constrains the scale invariance to be effective within some range, typically from 25% to 400%. The limit to a real function is more serious in that exact scale invariance, strictly speaking, is lost. Consider a real function based on the real part of Equation (1):

$$g(x) = \Re\{|x|^{p+i\alpha}\} = |x|^p \cos(\alpha \ln [x]) \quad (26)$$

A rescaling by a factor s provides:

$$g(sx) = \Re\{|sx|^{p+i\alpha}\} \quad (27)$$
$$= |s|^p|x|^p\{\cos(\alpha \ln[x])\cos(\alpha \ln[s]) - \sin(\alpha \ln[x])\sin(\alpha \ln[s])\}$$

Clearly this is not a simple complex factor as shown in Equation (2). A new component has been introduced. The new sin(αln[x]) component is known as the quadrature function of the cos(αln[x]) function. There is an elegant manner for regaining the overall scale invariance in the detection methods 200, 400 and 500, and that is to use a fully complex matching function in the correlation procedure. The general manner can be represented as follows:

$$c(r, \theta) = \int_{-\infty}^{+\infty} g^*(\eta - r) \mathcal{R}\{\rho(\eta, \theta)\} d\eta \equiv g(r) \otimes \mathcal{R}\{\rho(r, \theta)\} \quad (28)$$

Assuming a general scale invariant spread-spectrum/spread space function g, it can be proved that the correlation of a complex matching function with a real embedded function gives essentially the same correlation peak as a complex-complex correlation, but reduced by a factor of two. Hence, $$|g(r) \otimes \mathcal{R}\{\rho(r, \theta)\}| \cong \frac{|g(r) \otimes \rho(r, \theta)|}{2} \quad (29)$$

There is an insubstantial difference in the detection peak shape, with the background difference being orders of magnitude below the peak level. Note that maintenance of the line's overall energy (via the Parseval/Plancherel theorem) is important for consistent peak values between lines with different values of the orientation angle θ. The energy is intrinsically maintained for conventional correlation; however, phase correlation requires specific attention to maintain the correct energy for each line.

Referring again to FIG. 2 where the method 300 of embedding a one-dimensional pattern is shown, an alternative one-dimensional basis function that may be used to generate the pattern(s) in step 310 is a spread spectrum function of the form:

$$g'(r) = \text{random}(\text{seed}, r) \quad (30)$$

where r is a one dimensional coordinate, while seed is the seed number of a suitably chosen pseudo random number generator. A nominated axis of the pattern generated from the basis function g'(r) coincides with the origin of the pseudo random sequence generated from the basis function g'(r).

Figure 4C:
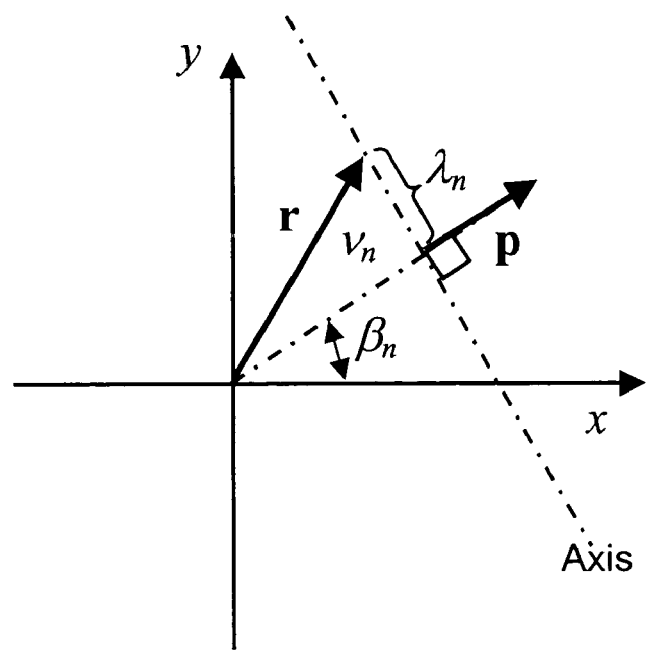
FIG. 4C illustrates a relationship between the vectors r and p.
Figure 4D:
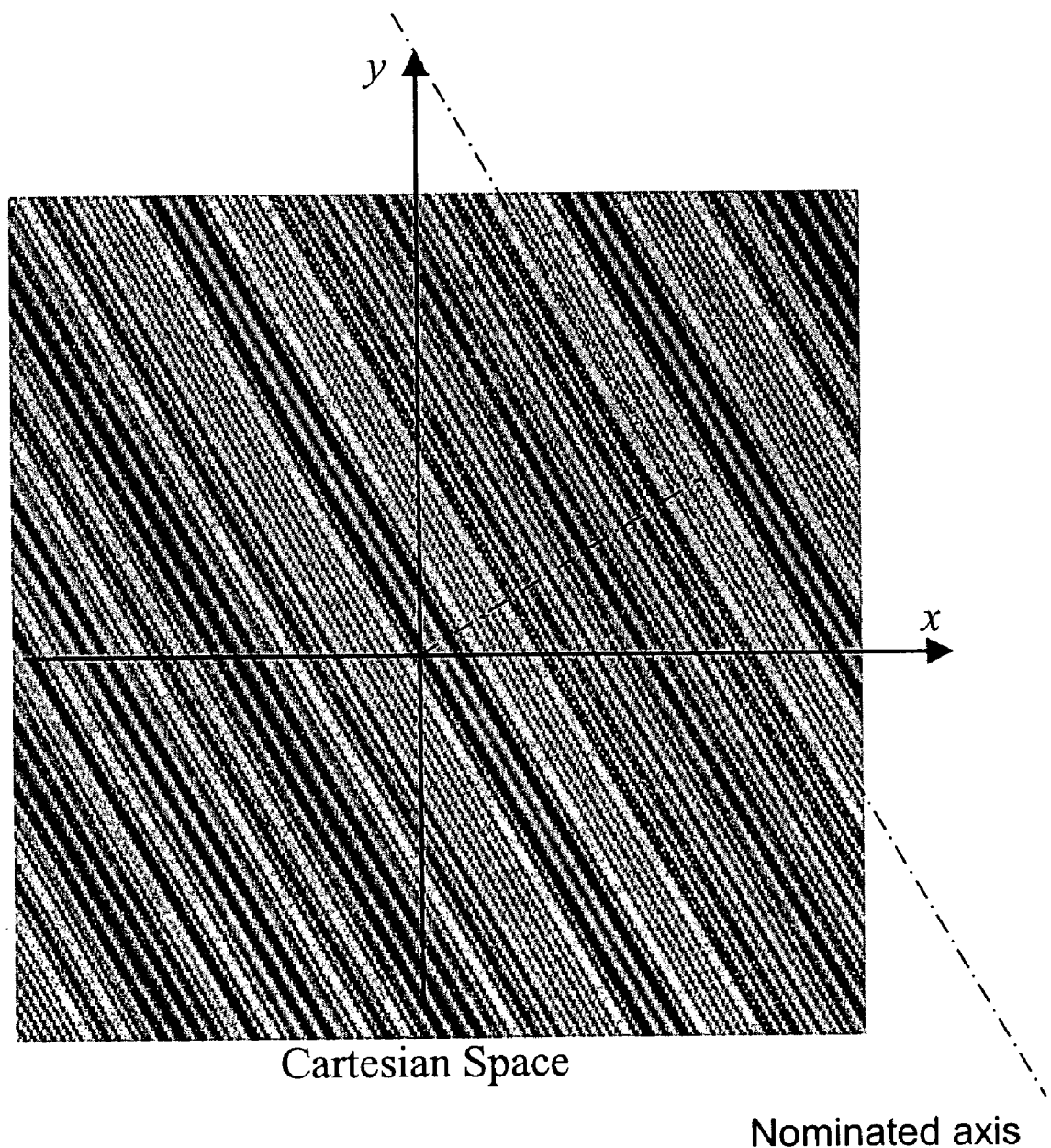
FIG. 4D illustrates another example pattern.
Figure 4E:
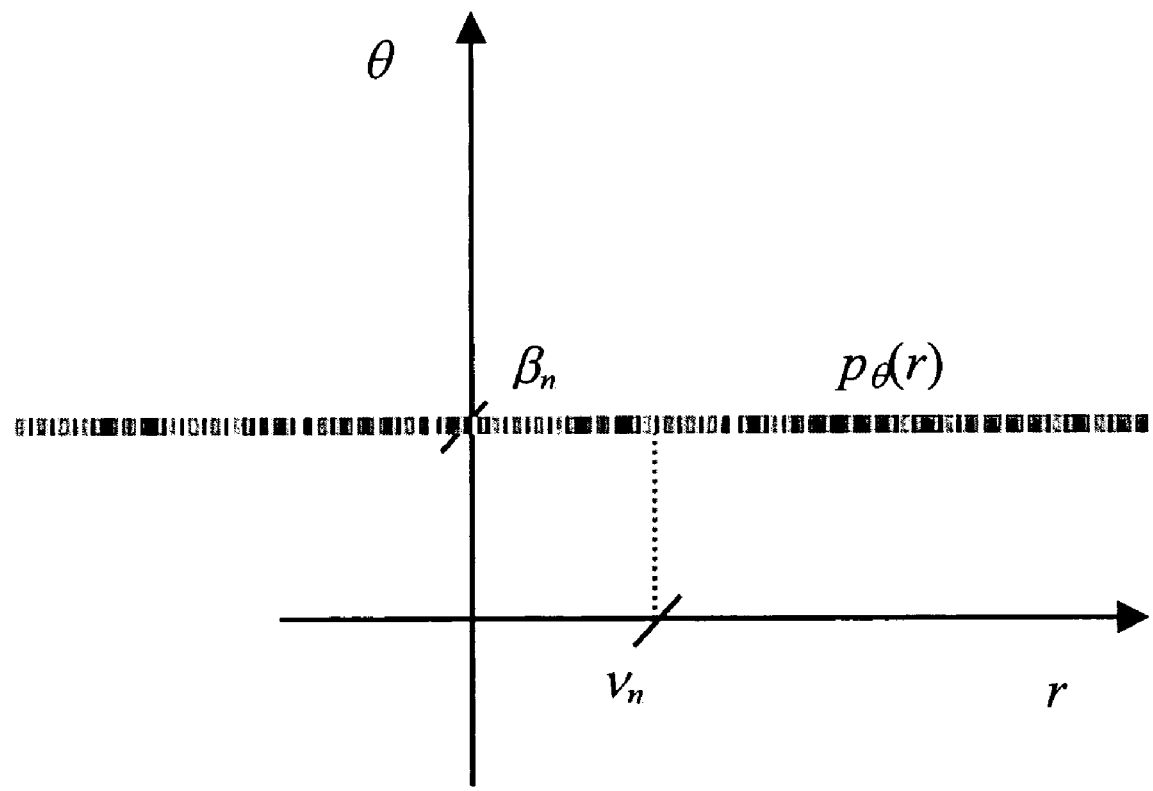
FIG. 4E illustrates the basis function used to generate the pattern illustrated in FIG. 4D together with the orientation angle and perpendicular displacement from the centre of the pattern image of the axis of the pattern.

FIG. 4D illustrates an example pattern generated using the basis function of Equation (30). In illustrating the example pattern, pattern values has been mapped to values in the range of [0, 255], with a value of 0 being represented as the colour white and a value of 255 being represented as the colour black. FIG. 4E illustrates the basis function g'(r) used to generate the pattern illustrated in FIG. 4D together with the orientation angle $\beta_n$ and perpendicular displacement $v_n$ (from the centre of the pattern image) of the axis.

Yet another spread spectrum function g" that may be used to generate the pattern(s) in step 310 (FIG. 2) is the function of the form:

$$g''(r) = F^{-1}\{\text{const.} \exp(i.\psi_{random})\} \quad (32)$$

having a constant magnitude and pseudo random phase uniformly distributed in the range -π to +π.

Other possible spread spectrum functions are M-sequences, spectrally weighted pseudo-noise sequences such as red noise; and sequences derived from chaotic or stochastic systems.

However, the functions shown in Equations (30) and (31) are not scale-invariant. Accordingly, when any one of the functions shown in Equations (30) and (31) is correlated with a scaled version of itself, a dominant correlation peak will generally not result.

Figure 1D:
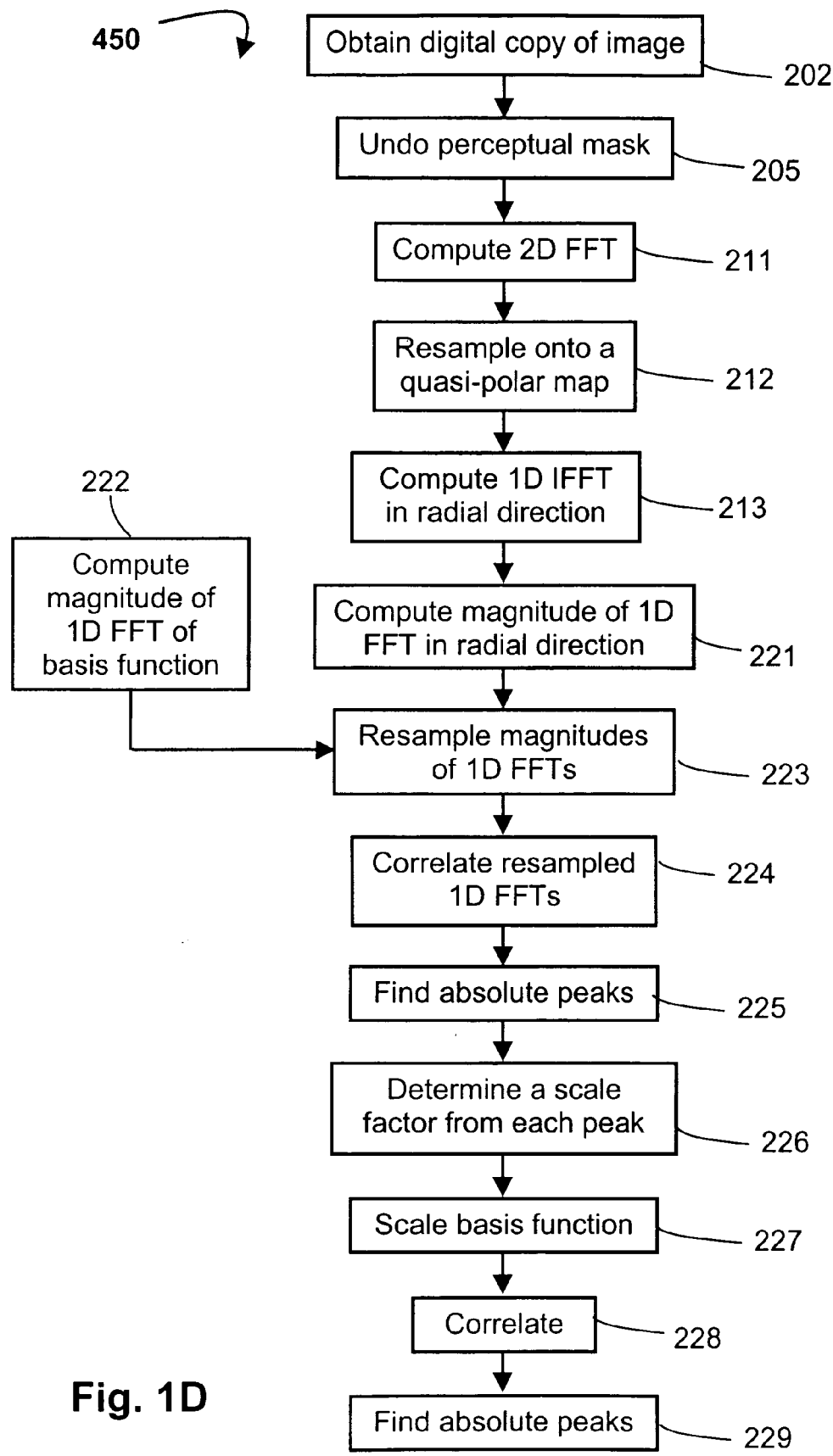
FIG. 1D shows a flow diagram of a method which is yet another implementation of the method shown in FIG. 1A, but which may be used for detecting a general one-dimensional pattern.

As methods 400 and 500 shown in FIGS. 1B and 1C respectively may only be used to detect one or more scale-invariant patterns embedded in an image, FIG. 1D shows a flow diagram of a method 450, which is another implementation of the method 200 (FIG. 1A), but which may be used for detecting a general one-dimensional pattern, such as those formed from Equations (30) and (32), embedded in an image. Again the Radon transform is used as the projective transform, and is implemented by resampling in the frequency domain. Accordingly, steps 202 to 213 are the same as those described in relation to method 400 (FIG. 1B).

After step 213 method 450 continues in step 221 where the magnitude of the 1-dimensional FFT in the radial direction of the Radon transform is calculated by the processor 105 for all desired angle values. Also, in step 222, the magnitude of the 1-dimensional FFT of the (one-dimensional) basis function is calculated by the processor 105.

The processor 105 next, in step 223, resamples the magnitudes of the Fourier transforms resulting from steps 221 and 222 onto a logarithmic sampling space. If the basis function g(r) has N samples, then the logarithmic sampling space used in step 223 is related to the frequency space of the FFT through $$f_i = e^{\pi \zeta_i} \quad (33)$$

where $f_i$ denotes the radial frequency, i ranges from -N/2+1 to N/2 and $$\lambda = \frac{2}{N} \ln \frac{N}{2}.$$

The results of the resampling are then, in step 224, correlated (using one-dimensional correlation) along constant radial lines for all angle values. In the result of the correlation of step 224, the processor 105 then, in step 225, finds the absolute peak of values, if a peak exists, along each constant radial line. If a peak exists in a constant radial line corresponding to a specific angle value, then the location of this peak is used to determine, in step 226, a scale factor κ that relates the basis function g(r) to the pattern that exists in the image at that specific angle. The scale factor κ is used in step 227 to scale the one-dimensional basis function g(r) to substantially the same scale as the pattern in the radial line being considered. In particular, if the peak is located at sample ζ, then the scale factor κ is given by:

$$\kappa = e^{\lambda \zeta} \quad (34)$$

The scaling may be achieved using cubic interpolation or other interpolation schemes such as Fourier-based interpolation.

Method 450 continues in step 228 where the scaled basis function is correlated with the Radon transform of the image, which is the result from step 213, along the constant radial line being considered. Finally in step 229 the processor 105 finds the absolute peaks of the correlation in step 228. The location of this peak determines the perpendicular displacement $v_n$ of each embedded pattern at orientation angle $\beta_n$.

As set out above, each pattern included in the embedded watermark has two spatial parameters, those being the perpendicular displacement $v_n$ and the orientation angle $\beta_n$. Distortions result in a change in one or both the spatial parameters of the patterns. FIG. 8A shows 3 correlation peaks detected in an image having 3 embedded patterns with different parameters. FIG. 8B shows the correlation peaks detected from a distorted version of the same image. As can be seen when the positions of the peaks in FIGS. 8A and 8B are compared, the spatial parameters of the patterns have changed due to the distortions.

Rotation, scaling, anamorphic scaling and shear are affine transformations in that they preserve straight lines along with the parallelism of lines, but not lengths and angles. Such distortions may be represented by a 2×2 matrix operating upon a coordinate vector (x,y) to give a coordinate (x',y') as follows:

$$\begin{pmatrix} x' \\ y' \end{pmatrix} = \begin{pmatrix} a & b \\ c & d \end{pmatrix} \begin{pmatrix} x \\ y \end{pmatrix} \Rightarrow x' = Ax \quad (35)$$

Rotation may be written in the matrix form of Equation (35) as follows:

$$\begin{pmatrix} x' \\ y' \end{pmatrix} = \begin{pmatrix} \cos\beta & \sin\beta \\ -\sin\beta & \cos\beta \end{pmatrix} \begin{pmatrix} x \\ y \end{pmatrix} \quad (36)$$

Similarly, scaling may be written as:

$$\begin{pmatrix} x' \\ y' \end{pmatrix} = \begin{pmatrix} a & 0 \\ 0 & a \end{pmatrix} \begin{pmatrix} x \\ y \end{pmatrix} \quad (37)$$

Anamorphic scaling along the x and y axes is sometimes called aspect ratio change and has the form:

$$\begin{pmatrix} x' \\ y' \end{pmatrix} = \begin{pmatrix} a_x & 0 \\ 0 & a_y \end{pmatrix} \begin{pmatrix} x \\ y \end{pmatrix} \quad (38)$$

The scaling may be along any two directions, with those directions not necessarily being orthogonal. Shear distortion must therefore have the shear direction specified. In the case of shear in the x direction, the distortion has the form:

$$\begin{pmatrix} x' \\ y' \end{pmatrix} = \begin{pmatrix} 1 & b_x \\ 0 & 1 \end{pmatrix} \begin{pmatrix} x \\ y \end{pmatrix} \quad (39)$$

and in the y direction:

$$\begin{pmatrix} x' \\ y' \end{pmatrix} = \begin{pmatrix} 1 & 0 \\ b_y & 1 \end{pmatrix} \begin{pmatrix} x \\ y \end{pmatrix} \quad (40)$$

By using four or more patterns in the watermark, with the patterns having suitable spatial parameters, the total distortion may be estimated. The total distortion may also be decomposed into convenient combinations of the prime distortions, namely rotation, scaling, anamorphic scaling and shear. Consider for example a general distortion followed by translation, which may be expressed as:

$$\begin{pmatrix} x' \\ y' \end{pmatrix} = s \begin{pmatrix} a_{11} & a_{12} \\ a_{21} & a_{22} \end{pmatrix} \begin{pmatrix} x \\ y \end{pmatrix} + \begin{pmatrix} x_0 \\ y_0 \end{pmatrix} \quad (41)$$

wherein s is a scaling factor, and $(x_0, y_0)^T$ is a translation. When the scaling factor s is negative, the distortion is rotation by 180°. Furthermore $$\det\begin{pmatrix} a_{11} & a_{12} \\ a_{21} & a_{22} \end{pmatrix} = -1 \quad (42)$$

indicates that a reflection has occurred. Consider a point (x,y) on the axis before distortion, the point (x,y) being a distance $\lambda_n$ along the axis. The canonical representation of the point (x,y) is:

$$\begin{cases} x = v_n \cos\beta_n - \lambda_n \sin\beta_n \\ y = v_n \sin\beta_n + \lambda_n \cos\beta_n \end{cases} \quad (43)$$

Representing the point (x,y) as a vector r, and defining a vector p as the unit vector perpendicular to the axis as follows:

$$\begin{cases} r = xi + yj \\ p = \cos\beta_n i + \sin\beta_n j \end{cases} \quad (44)$$

then the dot product of vectors r and p is equal to the displacement $v_n$ as follows:

$$r \cdot p = v_n = x \cos\beta_n + y \sin\beta_n \quad (45)$$

FIG. 4C illustrates the relationship between the vectors r and p, as well as the distances $v_n$ and $\lambda_n$. Defining $\cos\beta_n = c_n$, and $\sin\beta_n = s_n$, and substituting Equation (43) into Equation (41) provides:

$$\begin{cases} x' = sa_{11}(v_n c_n - \lambda_n s_n) + sa_{12}(v_n s_n + \lambda_n c_n) + x_0 \\ y' = sa_{21}(v_n c_n - \lambda_n s_n) + sa_{22}(v_n s_n + \lambda_n c_n) + y_0 \end{cases} \quad (46)$$

Writing Equation (46) in a different form provides:

$$\frac{x' - x_0 - v_n(a_{11}c_n + a_{12}s_n)s}{(-a_{11}s_n + a_{12}c_n)s} = \lambda_n = \frac{y' - y_0 - v_n(a_{21}c_n + a_{22}s_n)s}{(-a_{21}s_n + a_{22}c_n)s} \quad (47)$$

$$(x'-x_0)(-a_{21}s_n + a_{22}c_n) - (y'-y_0)(-a_{11}s_n + a_{12}c_n) = sv_n$$
$$(a_{11}c_n + a_{12}s_n)(-a_{21}s_n + a_{22}c_n) - sv_n(a_{21}c_n + a_{22}s_n)(-a_{11}s_n + a_{12}c_n) \quad (48)$$

Similar to the above, vector $\hat{r}$ is the vector to point (x',y'), that is point (x,y) after the distortion, unit vector $\hat{p}$ is perpendicular to the axis of the distorted pattern and forming an angle $\hat{\beta}_n$ with the horizontal axis, and point (x',y') being a distance $\hat{\lambda}_n$ along the axis. The canonical representation of the point (x', y') is:

$$\left.\begin{array}{l} x' = \hat{v}_n \cos\hat{\beta}_n - \hat{\lambda}_n \sin\hat{\beta}_n \\ y' = \hat{v}_n \sin\hat{\beta}_n + \hat{\lambda}_n \cos\hat{\beta}_n \end{array}\right\} \quad (49)$$

Also, the dot product of vectors $\hat{r}$ and $\hat{p}$ is equal to the displacement $\hat{v}_n$ after distortion as follows:

$$\hat{r}\cdot\hat{p} = \hat{v}_n = x' \cos\hat{\beta}_n + y' \sin\hat{\beta}_n \quad (50)$$

Combining Equations (46) and (50) provides:

$$\tan\hat{\beta}_n = \frac{(a_{11}s_n - a_{12}c_n)}{(-a_{21}s_n + a_{22}c_n)} \quad (51)$$

$$\hat{v}_n = v_n s \frac{(a_{11}c_n + a_{12}s_n)(-a_{21}s_n + a_{22}c_n) - (a_{21}c_n + a_{22}s_n)(-a_{11}s_n + a_{12}c_n)}{\sqrt{(a_{11}c_n + a_{12}s_n)^2 + (a_{11}c_n + a_{12}s_n)^2}} + \frac{x_0(-a_{21}s_n + a_{22}c_n) + y_0(a_{11}c_n + a_{12}s_n)}{\sqrt{(a_{11}c_n + a_{12}s_n)^2 + (a_{11}c_n + a_{12}s_n)^2}} \quad (52)$$

The parameters $\hat{\beta}_n$ and $\hat{v}_n$ are available from the position of the peak for each pattern detected using method 200 (or equivalently method 400, 450, or 500). Equations (51) and (52) include 7 unknowns. Therefore, by embedding and detecting at least 4 patterns with different parameters, and solving Equation (51) and (52), the distortion parameters s, $a_{11}$, $a_{12}$, $a_{21}$, $a_{22}$, $x_0$ and $y_0$ can be found. With the distortion parameters s, $a_{11}$, $a_{12}$, $a_{21}$, $a_{22}$, $x_0$ and $y_0$ known, the distortions may be reversed to form the undistorted image.

Typically, both the perpendicular displacement $v_n$ and the orientation angle $\beta_n$ are chosen to be widely separated in the embedded patterns to give the best accuracy. Use of more than 3 patterns allows noise insensitive redundancy in the arrangement of patterns.

In general, more than 3 patterns are required if reflection is also to be detected in addition to rotation, scaling, anamorphic scaling and shear. Once the distortion parameters are known, the original parameters, that is the perpendicular displacement $v_n$ and the orientation angle $\beta_n$ of each pattern, may be determined.

Using method 300 for embedding a watermarking and method 200, 400 or 500 to detect the embedded watermark, data or a pointer to that data (for example using a URL or pointer to that URL) may be embedded into an image. The so-called image metadata, that is data about, or referring to some property of that image, is thus bound to the image in that it can be retrieved from the image even if the image is distorted.

The metadata may include a database address, or related data. This allows images to be uniquely associated with a database address, even if the image is processed and any datafile heading removed through malicious intent or mere format conversion. Similarly, the metadata may include copyright information of the image.

The distortions that the metadata can resist include the projective transforms above, but also include the following:
Printing;
Photocopying/copying;
Scanning;
Colour removal;
Gamma correction/gamma change;
JPEG compression/general compression;
Format conversion (ie BMP to GIF);
Noise addition and removal;
Filtering, such as low-pass filtering; and
Cropping.

The manner in which the metadata may be encoded into the image includes:
Encoding the metadata in an arrangement of embedded patterns, that is, using the paramenters $\beta_n$ and $v_n$ of embedded patterns. The decoding, which follows detection, then consists in recognising the arrangement irrespective of projective transformations.
Encoding the metadata using an alternative watermarking scheme. Additional patterns are embedded using method 300, which are then detected using the method 200, 400 or 500. Using the additional patterns, the image distortion is then determined, followed by reversing the distortion. The watermarks used to encode the metadata may then be detected and decoded in the usual manner. Alternatively, the transformation, once determined, may be used to define a mapped detection of the alternative watermark, followed by a mapped decoding, if required. This approach avoids direct image inversion and the associated computation of image warping/interpolation.

In some situations it is not necessary that the embedded patterns be imperceptible to the human eye. Nor may it be necessary that the object undergoing embedding be an image. For example a planar object, such as a silicon wafer, may have a number of patterns embedded, using engraving or etching, in its surface. The patterns may then be utilised to determine the surface's position and orientation.

Figure 11:
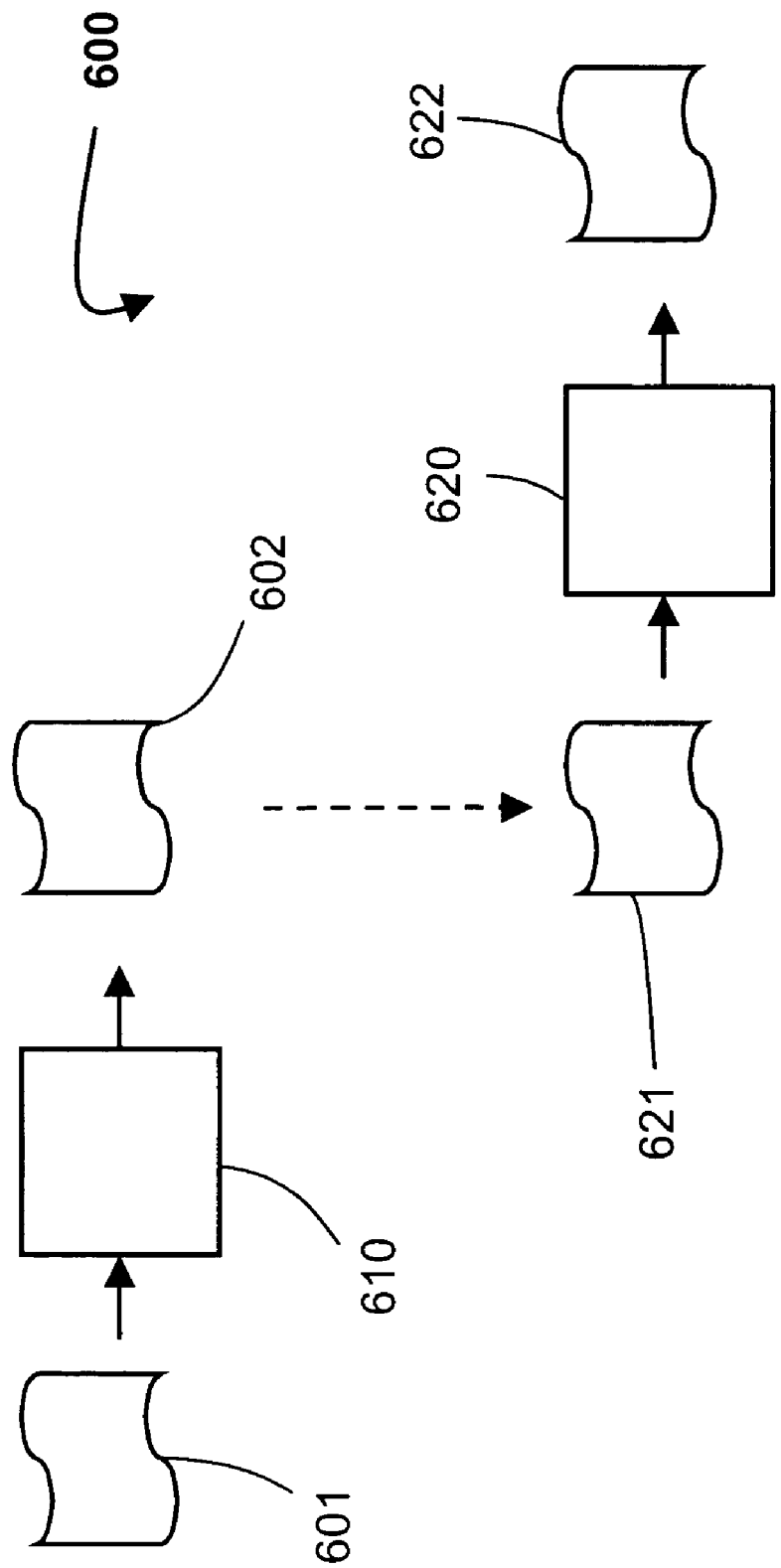
FIG. 11 shows a schematic block diagram of a system that may be used to implement the embedding and detection of watermarks in an image.

FIG. 11 shows a schematic block diagram of a system 600 that may be used to implement the embedding and detection of watermarks in an image. The system 600 includes a first apparatus 610 for receiving a first image 601, and for embedding a watermark into the image 601 to produce a second image 602.

The first apparatus 610 may be the general-purpose computer system 100 described in relation to FIG. 3 wherein the first image 601 is captured using imaging device 122, or received from the network 120. In this case, the second image 602 may be printed on printer 115 or directly communicated to another apparatus, such as a second apparatus 620, over the network 120.

In alternative implementation the method 300 is performed directly in a scanner or a camera, where the first image 601 is captured using an imaging device of the scanner or camera, and the second image 602 is in electronic form.

The system 600 further includes a second apparatus 620 for receiving a third image 621 that may contain an embedded watermarks, and for detecting the watermark, if such a watermark is present. The third image 621 may be the same as the second image 602, or may be a distorted version of the second image.

The second apparatus 620 may also be the general-purpose computer system 100 described in relation to FIG. 3 wherein the third image 621 is captured using imaging device 122, or received from the network 120.

The second apparatus 620 is operative to then detect the watermark, if a watermark exists, and report such to a user. The second apparatus 620 may additionally decode any information that may be embedded in the placement of the respective patterns making up the watermark. In a case where the second apparatus 620 expect to find an image with embedded patterns having predetermined parameters, the second apparatus 620 may detect that the third image 621 is a distorted version of the second image, and such distortions may be automatically reversed to produce a fourth image 622.

In an alternative implementations one of methods 200, 400 or 500 is performed directly in a scanner, where the third image 621 is captured using the scanner. The scanner may then alert the user, automatically reverse distortions to produce the fourth image 622, or decode information encoded in the parameters of the embedded patterns.

The foregoing describes only some embodiments of the present invention, and modifications and/or changes can be made thereto without departing from the scope and spirit of the invention, the embodiments being illustrative and not restrictive.

We claim:

1. A method of detecting spatial parameters of one or more patterns embedded in an image, each pattern having been formed substantially from a one-dimensional basis function, said method comprising the steps of:
    (a) calculating a projective transform of said image for a selection of angles;
    (b) calculating a 1-D correlation between each projective transform and said basis function; and
    (c) finding one or more peaks of said correlation, wherein the position of each of said peaks provides spatial parameters of one of said one or more embedded patterns.

2. A method as claimed in claim 1, wherein step (a) comprises the sub-steps of:
    (a1) transforming said image to the frequency domain using a two-dimensional transform;
    (a2) resampling the transformed image onto a quasi-polar map; and
    (a3) inverse transforming the resampled image to the space domain using a one-dimensional transform.

3. A method as claimed in claim 1, wherein step (b) comprises the sub-steps of:
    (b1) transforming said projective transform to the frequency domain using a one-dimensional transform;
    (b2) transforming said basis function to the frequency domain using a one-dimensional transform;
    (b3) multiplying the transformed projective transform with the transformed basis function along radial lines to create a result; and
    (b4) inverse transforming said result to the space domain using a one-dimensional transform.

4. A method as claimed in claim 1, wherein step (b) comprises the sub-steps of:
    (b1) determining a scale factor;
    (b2) scaling said basis function with said scale factor to form a scaled basis function; and
    (b3) cross-correlating said scaled basis function and said projective transform for a selection of angles.

5. A method as claimed in claim 4, wherein step (b1) comprises the sub-steps of:
    (b1i) calculating a magnitude of the 1-dimensional Fourier transform of said basis function;
    (b1ii) calculating a magnitude of the 1-dimensional Fourier transform of said projective transform;
    (b1iii) resampling said magnitudes onto a logarithmic sampling space;
    (b1iv) correlating the resamp led magnitudes of the 1-dimensional Fourier transforms of said basis function and projective transform along constant radial lines; and
    (b1v) finding at least one absolute peak in the result of step (b1iii), wherein the location of said peak is used to determine said scale factor.

6. A method of determining transformations applied to an image, said image having at least three patterns embedded therein, each pattern having been formed substantially from a one-dimensional basis function being substantially scale invariant, said method comprising the steps of:
    (a) calculating a projective transform of said image for a selection of angles;
    (b) calculating a 1-D correlation between each projective transform and said basis function;
    (c) finding peaks of said correlation, wherein the positions of said peaks provide spatial parameters of said embedded patterns; and
    (d) determining from said spatial parameters said transformations.

7. A method of detecting spatial parameters of one or more patterns embedded in an image, each pattern having been formed substantially from a one-dimensional basis function, said method comprising the steps of:
    transforming said image to the frequency domain using a two-dimensional transform;
    resampling the transformed image onto a quasi-polar map;
    transforming said basis function to the frequency domain using a one-dimensional transform;
    multiplying the resampled transformed image with the transform of said basis function along radial lines to create a first result;
    inverse transforming said first result to the space domain using a one-dimensional transform to create a second result; and
    finding one or more peaks of said second result, wherein the position of each of said peaks provides the spatial parameters of one of said one or more embedded patterns.

8. A method of determining transformations applied to a first image, said first image being a transformed copy of a second image, said second image having at least three patterns embedded therein, each pattern having predefined parameters and having been formed substantially from a one-dimensional basis function being substantially scale invariant as herein defined, said method comprising the steps of:
    calculating a projective transform of said first image for a selection of angles;
    calculating a 1-D correlation between each projective transform and said basis function;
    finding peaks of said correlation, each peak corresponding with one of said embedded patterns; and
    determining said transformations from the positions of said peaks and said parameters of said patterns embedded into said second image.

9. A method of embedding a watermark into an image, said method comprising the steps of:
    maintaining a basis function, said basis function being a substantially scale invariant one-dimensional function excluding the function $f(r)=\cos(\alpha \log|r|+c)$ wherein and c are constants;
    forming one or more patterns from said basis function, each pattern having no variation in one direction; and
    adding said basis pattern(s) to said image.

10. A method as claimed in claim 9, wherein said scale invariant one-dimensional function is a function wherein the profile of the phase of said function is substantially invariant after scaling within a predefined range of values.

11. A method as claimed in claim 10, wherein said scale invariant one-dimensional function is selected from the group comprising:

$$\chi(r) = r^P \exp\left(i\frac{\alpha}{\gamma}r^\gamma\right);$$

$$q_1(r) = [\text{sgn}(r)]^k \exp(i(\alpha r^{-P} + \epsilon));$$

$$q_2(r) = \sum_{n=N_1}^{N_2} \xi_n q_0(|\mu|^n r); \text{ and}$$

$$q_3(r) = [\text{sgn}(r)]^k r^P \exp\left(i\frac{\alpha}{\gamma}r^\gamma\right);$$

wherein $\gamma$, $\epsilon$, p, N1, N2, $\xi_n$, $\alpha$, k and $\mu$ are constants and $q_0$ is an arbitrary function.

12. A method as claimed in claim 9, wherein said basis function is a complex function and said one or more patterns are real valued.

13. A method as claimed in claim 9, wherein each pattern is added with a respective displacement from the image centre and a respective orientation.

14. An apparatus for detecting spatial parameters of one or more patterns embedded in an image, each pattern having been formed substantially from a one-dimensional basis function, said apparatus comprising:
    means for calculating a projective transform of said image for a selection of angles;
    means for calculating a 1-D correlation between each projective transform and said basis function; and
    means for finding one or more peaks of said correlation, wherein the position of each of said peaks provides the spatial parameters of one of said one or more embedded patterns.

15. An apparatus for determining transformations applied to an image, said image having at least three patterns embedded therein, each pattern having been formed substantially from a one-dimensional basis function being substantially scale invariant as herein defined, said apparatus comprising:
    means for calculating a projective transform of said image for a selection of angles;
    means for calculating a 1-D correlation between each projective transform and said basis function;
    means for finding peaks of said correlation, wherein the position of said peaks provide spatial parameters of said embedded patterns; and
    means for determining from said spatial parameters said transformations.

16. An apparatus for detecting spatial parameters of one or more patterns embedded in an image, each pattern having been formed substantially from a one-dimensional basis function, said apparatus comprising:
    means for transforming said image to the frequency domain using a two-dimensional transform;
    means for resampling the transformed image onto a quasi-polar map;
    means for transforming said basis function to the frequency domain using a one-dimensional transform;
    means for multiplying the resampled transformed image with the transform of said basis function along radial lines to create a first result;
    means for inverse transforming said first result to the space domain using a one-dimensional transform to create a second result; and
    means for finding a peak of said second result, wherein the position of each of said peaks provides the spatial parameters of one of said one or more embedded patterns.

17. An apparatus for determining transformations applied to a first image, said first image being a transformed copy of a second image, said second image having at least three patterns embedded therein, each pattern having predefined parameters and having been formed substantially from a one-dimensional basis function being substantially scale invariant as herein defined, said apparatus comprising:
    means for calculating a projective transform of said first image for a selection of angles;
    means for calculating a 1-D correlation between each projective transform and said basis function;
    means for finding peaks of said correlation, each peak corresponding with one of said embedded patterns; and
    means for determining said transformations from the positions of said peaks and said parameters of said patterns embedded into said second image.

18. An apparatus for embedding a watermark into an image, said apparatus comprising:
    means for maintaining a basis function, said basis function being a substantially scale invariant one-dimensional function excluding the function $f(r)=\cos(\alpha \log|r|+c)$ wherein and c are constants;
    means for forming one or more patterns from said basis function, each pattern having no variation in one direction; and
    means for adding said basis pattern(s) to said image.

19. A computer-readable medium storing a computer program for detecting spatial parameters of one or more patterns embedded in an image, each pattern having been formed substantially from a one-dimensional basis function, said program comprising:
    code for calculating a projective transform of said image for a selection of angles;
    code for calculating a 1-D correlation between each projective transform and said basis function; and
    code for finding one or more peaks of said correlation, wherein the position of each of said peaks provides the spatial parameters of one of said one or more embedded patterns.

20. A computer-readable medium storing a computer program for determining transformations applied to an image, said image having at least three patterns embedded therein, each pattern having been formed substantially from a one-dimensional basis function being substantially scale invariant as herein defined, said program comprising:
    code for calculating a projective transform of said image for a selection of angles;
    code for calculating a 1-D correlation between each projective transform and said basis function;
    code for finding peaks of said correlation, wherein the positions of said peaks provide spatial parameters of said embedded patterns; and
    code for determining from said spatial parameters said transformations.

21. A computer-readable medium storing a computer program for detecting spatial parameters of one or more patterns embedded in an image, each pattern having been formed substantially from a one-dimensional basis function, said program comprising:

code for transforming said image to the frequency domain using a two-dimensional transform;

code for resampling the transformed image onto a quasi-polar map;

code for transforming said basis function to the frequency domain using a one-dimensional transform;

code for multiplying the resampled transformed image with the transform of said basis function along radial lines to create a first result;

code for inverse transforming said first result to the space domain using a one-dimensional transform to create a second result; and code for finding one or more peaks of said second result, wherein the position of each of said peaks provides spatial parameters of one of said one or more embedded patterns.

22. A computer-readable medium storing a computer program for determining transformations applied to a first image, said first image being a transformed copy of a second image, said second image having at least three patterns embedded therein, each pattern having predefined parameters and having been formed substantially from a one-dimensional basis function being substantially scale invariant as herein defined, said program comprising:

code for calculating a projective transform of said first image for a selection of angles;

code for calculating a 1-D correlation between each projective transform and said basis function;

code for finding peaks of said correlation, each peak corresponding with one of said embedded patterns; and code for determining said transformations from the positions of said peaks and said parameters of said patterns embedded into said second image.

23. A computer-readable medium storing a computer program for embedding a watermark into an image, said program comprising:

code for maintaining a basis function, said basis function being a substantially scale invariant one-dimensional function excluding the function $f(r)=\cos(\alpha \log|r|+c)$ wherein $\alpha$ and c are constants;

code for forming one or more patterns from said basis function, each pattern having no variation in one direction; and code for adding said basis pattern(s) to said image.

\* \* \* \* \*

UNITED STATES PATENT AND TRADEMARK OFFICE
CERTIFICATE OF CORRECTION

PATENT NO. : 7,313,249 B2
APPLICATION NO. : 10/660623
DATED : December 25, 2007
INVENTOR(S) : Peter Alleine Fletcher et al.

It is certified that error appears in the above-identified patent and that said Letters Patent is hereby corrected as shown below:

Col. 2, line 49, "and" should read --$\alpha$ and--.

Col. 3, line 33, "in" should be deleted.

Col. 5, line 15, "sub functions" should read --subfunctions--.

Col. 6, line 29, "res-" should read --re--.
line 30, "caled" should read --scaled--.

Col. 8, line 35, "v etc." should read --v, etc.--.
line 45, "mpeg etc." should read --mpeg, etc.--

Col. 9, line 27, "two dimen-" should read --two-dimen- --.

Col. 10, line 32, "an" should read --a--.
line 37, "an" should read --a--.

Col. 12, line 44, "shear, patterns" should read --shear patterns--.

Col. 13, line 47, "has" should read --have--.

Col. 14, line 28, "$f_i = e^{\pi \xi i}$ (33)" should read --$f_i = e^{\lambda \xi i}$ (33)--.

Col. 18, line 3, "(ie" should read --(i.e.,--.
line 30, "For example" should read --For example,--.
line 54, "watermarks," should read --watermark--.
line 67, "expect" should read --expects--.

Col. 19, line 6, "implementations" should read --implementation,--.

Col. 20, line 59, "and" should read --$\alpha$ and--.

UNITED STATES PATENT AND TRADEMARK OFFICE
CERTIFICATE OF CORRECTION

PATENT NO.         : 7,313,249 B2
APPLICATION NO.   : 10/660623
DATED              : December 25, 2007
INVENTOR(S)        : Peter Alleine Fletcher et al.

It is certified that error appears in the above-identified patent and that said Letters Patent is hereby corrected as shown below:

Col. 21, line 22, "N1,N2," should read --$N_1, N_2$,--.
        line 54, "provide" should read --provides--.

Col. 22, line 32, "and" should read --$\alpha$ and--.

Signed and Sealed this

Fifth Day of August, 2008

JON W. DUDAS
*Director of the United States Patent and Trademark Office*